(12) United States Patent
Powell et al.

(10) Patent No.: US 10,360,484 B2
(45) Date of Patent: Jul. 23, 2019

(54) BARCODE-READING SYSTEM

(71) Applicant: The Code Corporation, Draper, UT (US)

(72) Inventors: George Powell, Draper, UT (US); Ming Lei, Princeton Junction, NJ (US); Ryan Hoobler, Salt Lake City, UT (US)

(73) Assignee: THE CODE CORPORATION, Draper, UT (US)

( * ) Notice: Subject to any disclaimer, the term of this patent is extended or adjusted under 35 U.S.C. 154(b) by 0 days.

(21) Appl. No.: 15/895,994

(22) Filed: Feb. 13, 2018

(65) Prior Publication Data

US 2018/0181850 A1    Jun. 28, 2018

Related U.S. Application Data

(63) Continuation of application No. 15/145,498, filed on May 3, 2016, now Pat. No. 9,892,355, which is a
(Continued)

(51) Int. Cl.
*G06K 7/00* (2006.01)
*G06K 19/06* (2006.01)
(Continued)

(52) U.S. Cl.
CPC ..... *G06K 19/06037* (2013.01); *G06K 7/0004* (2013.01); *G06K 7/089* (2013.01);
(Continued)

(58) Field of Classification Search
CPC .......... G06K 19/06037; G06K 7/0004; G06K 7/089; G06K 7/10564; G06K 7/10722;
(Continued)

(56) References Cited

U.S. PATENT DOCUMENTS 7,089,594 B2 *  8/2006  Lal ........................ G06F 21/10
                                                        705/59
7,156,311 B2 *  1/2007  Attia ................. G06F 17/30879
                                                        235/462.08

(Continued)

FOREIGN PATENT DOCUMENTS

CN      203838715 U     9/2014
JP      2004032507 A    1/2004
WO      2015083979      6/2015

*Primary Examiner* — Seung H Lee
(74) *Attorney, Agent, or Firm* — Timothy P. O'Hagen; Ray Quinney & Nebeker

(57) ABSTRACT

A barcode reader is disclosed. The barcode reader may include a semiconductor package and an optic system. The semiconductor package may include a plurality of silicon dies stacked vertically and interconnected by through-silicon vias (TSVs) or wires. A first die positioned on top of the plurality of stacked silicon dies includes a photo sensor array and image read-out circuitry. The image read-out circuitry is coupled to the photo sensor array and configured to generate a frame of image data, wherein the frame of image data is a sequence of values, each value representing an intensity of illumination focused on one of the photo sensors. The optic system is configured to focus an image of a barcode on the photo sensor array. The optic system includes a lens assembly and a mirror. The mirror folds an optical path behind the lens assembly onto the array of photo sensors.

20 Claims, 27 Drawing Sheets

Related U.S. Application Data continuation-in-part of application No. 15/063,245, filed on Mar. 7, 2016, now Pat. No. 9,830,487, and a continuation-in-part of application No. 14/964,434, filed on Dec. 9, 2015, now Pat. No. 9,721,131, and a continuation-in-part of application No. 14/923,027, filed on Oct. 26, 2015, now Pat. No. 9,818,010, and a continuation-in-part of application No. 14/799,464, filed on Jul. 14, 2015, now Pat. No. 9,858,460, and a continuation-in-part of application No. 14/717,112, filed on May 20, 2015, now Pat. No. 10,133,902.

(51) Int. Cl.
  *G06K 7/10* (2006.01)
  *G06K 7/08* (2006.01)
  *H02J 7/00* (2006.01)
  *H01M 2/10* (2006.01)

(52) U.S. Cl.
  CPC ..... *G06K 7/10564* (2013.01); *G06K 7/10722* (2013.01); *G06K 7/10732* (2013.01); *G06K 7/10831* (2013.01); *G06K 7/10881* (2013.01); *H02J 7/0045* (2013.01); *H01M 2/1022* (2013.01)

(58) Field of Classification Search
  CPC ........... G06K 7/10732; G06K 7/10831; G06K 7/10881
  See application file for complete search history.

(56) References Cited

U.S. PATENT DOCUMENTS

| | | |
|---|---|---|
| 8,162,218 B2 | 4/2012 | Meier |
| 8,750,637 B2 | 6/2014 | Stroem |
| 9,257,396 B2 | 2/2016 | Uzoh |
| 9,696,612 B2 | 7/2017 | Anderson |
| 2003/0025822 A1 | 2/2003 | Shimada |
| 2003/0030923 A1 | 2/2003 | Hsu |
| 2004/0056956 A1 | 3/2004 | Gardiner et al. |
| 2006/0131419 A1 | 6/2006 | Nunnik |
| 2006/0284987 A1 | 12/2006 | Wolf, II |
| 2007/0158220 A1 | 7/2007 | Cleereman et al. |
| 2007/0205287 A1 | 9/2007 | Tien |
| 2008/0142599 A1 | 6/2008 | Benillouche |
| 2012/0061462 A1 | 3/2012 | Shadwell |
| 2013/0109316 A1 | 5/2013 | Lee |
| 2013/0155253 A1 | 6/2013 | Wood |
| 2014/0017955 A1 | 1/2014 | Lo |
| 2014/0171150 A1 | 6/2014 | Hurst et al. |
| 2014/0313377 A1 | 10/2014 | Hampton |
| 2014/0327815 A1 | 11/2014 | Auger |
| 2015/0126244 A1 | 5/2015 | Moran |
| 2015/0126245 A1 | 5/2015 | Barkan et al. |
| 2015/0317503 A1 | 11/2015 | Powell |
| 2016/0012269 A1 | 1/2016 | Kowalczyk et al. |
| 2016/0104016 A1 | 4/2016 | Deal |
| 2016/0104017 A1 | 4/2016 | Deal |
| 2016/0171357 A1 | 6/2016 | Kwon |
| 2016/0180128 A1 | 6/2016 | Utykanski |
| 2016/0180129 A1 | 6/2016 | Utykanski |
| 2016/0188932 A1 | 6/2016 | Powell |
| 2016/0188933 A1 | 6/2016 | Powell |
| 2016/0188934 A1 | 6/2016 | Powell |
| 2016/0232389 A1 | 8/2016 | Gifford |
| 2016/0321483 A1 | 11/2016 | Utykanski |
| 2016/0321485 A1 | 11/2016 | Utykanski |
| 2016/0373629 A1 | 12/2016 | Jung |
| 2017/0004340 A1 | 1/2017 | Powell |

* cited by examiner

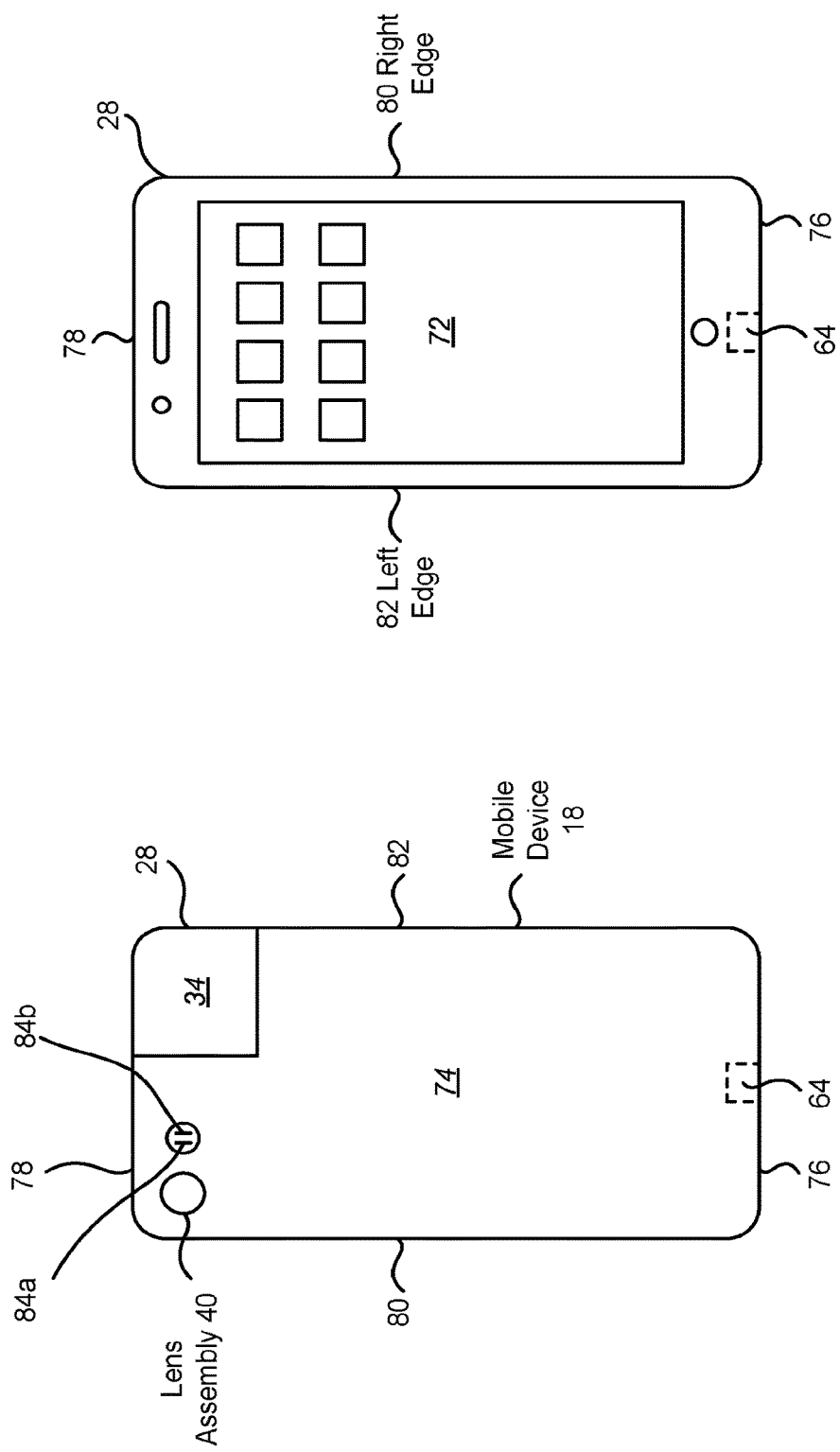

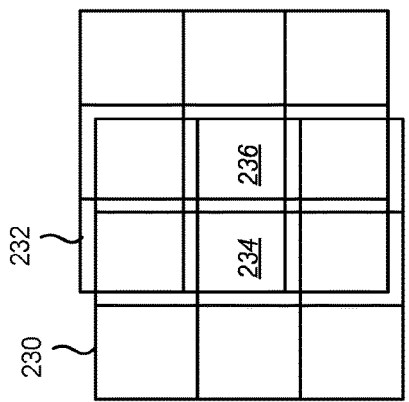
FIG. 9B
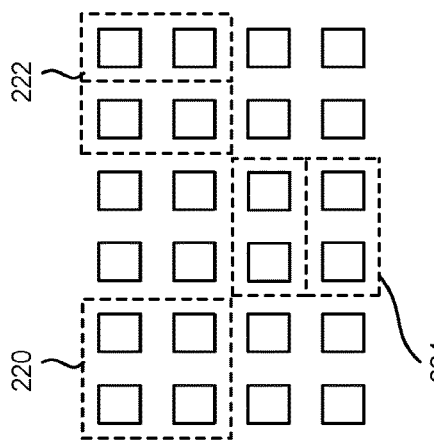
FIG. 9A
FIG. 9C

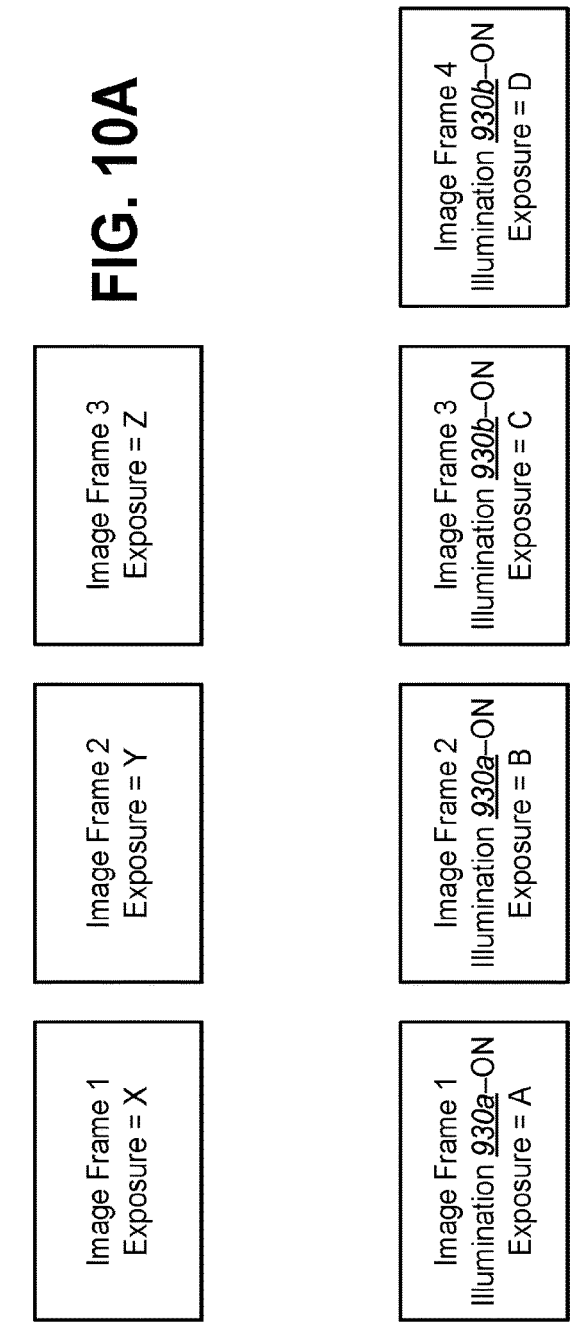

| Exemplary Derivatives of a Frame of Image Data Produced by Permutations of Preprocessing Circuits or an Image Processing Module |
|---|
| Full Frame |
| Binning of a Full Frame or a Window of a Full Frame (Average Digital Values) |
| Sub-Sample of a Full Frame for a Window of a Full Frame |
| Rotation of Full Frame, a Window of a Full Frame or Binned Full Frame or Window of a Full Frame. (All Columns or Sub-Sampled Selected Columns/Rows) |
| Convolution of Full Frame, a Window of a Full Frame, a Binned Full Frame or Window of a Full Frame, or a Sub-Sampled Full Frame of Window of a Full Frame (Selected One of Multiple Kernels) |
| Double Convolution of Full Frame, a Window of a Full Frame, a Binned Full Frame or Window of a Full Frame, or a Sub-Sampled Full Frame of Window of a Full Frame (Two Distinct Kernels Applied Sequentially) |

FIG. 11

Group ID ~ 740
    License ID ~ 742
        Qty. Purchased : XX ~ 744
        Qty. Used      : YY ~ 746
        Qty. Remaining : ZZ ~ 748

Group ID ~ 750
    License ID ~ 752a
        Qty. Purchased : Unlimited ~ 754a
        Qty. In Use    : N/A ~ 756a
        Qty. Remaining : N/A ~ 758a
    License ID ~ 752b
        Qty. Purchased : XX ~ 754b
        Qty. In Use    : YY
        Qty. Remaining : ZZ
        756b
        758b

| ID | Expire |
|----|--------|
| 1  | MM/DD  |
| 2  | MM/DD  |
| 3  | MM/DD  |
| 4  | MM/DD  |
| 5  | MM/DD  |
| 6  | MM/DD  |
| 7  | MM/DD  |
| 8  | MM/DD  |

FIG. 16C

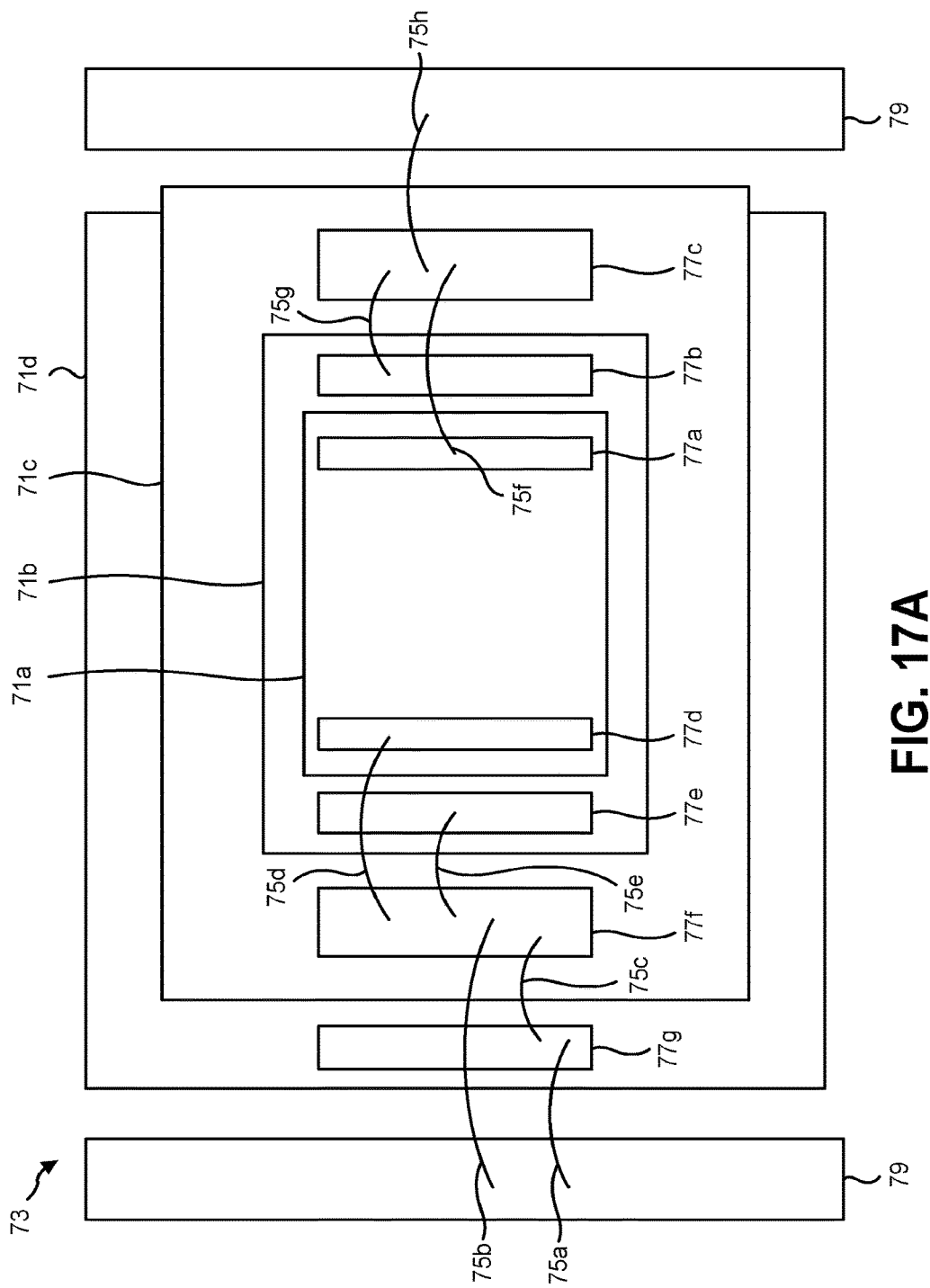

BARCODE-READING SYSTEM

RELATED APPLICATIONS

This application is a continuation of U.S. patent application Ser. No. 15/145,498 (the '498 Application), filed May 3, 2016, issued as U.S. Pat. No. 9,892,355 on Feb. 13, 2018, and titled "BARCODE-READING SYSTEM". The '498 Application is a continuation-in-part of U.S. patent application Ser. No. 15/063,245, filed Mar. 7, 2016, issued as U.S. Pat. No. 9,830,487 on Nov. 28, 2017, and entitled "BARCODE-READING SYSTEM".

The '498 Application is also a continuation-in-part of U.S. patent application Ser. No. 14/964,434, filed Dec. 9, 2015, issued as U.S. Pat. No. 9,721,131 on Aug. 1, 2017, and entitled "BARCODE-READING SYSTEM".

The '498 Application is also a continuation-in-part of U.S. patent application Ser. No. 14/923,027, filed Oct. 26, 2015, issued as U.S. Pat. No. 9,818,010 on Nov. 14, 2017, and entitled "BARCODE-READING SYSTEM".

The '498 Application is also a continuation-in-part of U.S. patent application Ser. No. 14/799,464, filed Jul. 14, 2015, issued as U.S. Pat. No. 9,858,460 on Jan. 2, 2018, and entitled "A BARCODE-READING SYSTEM".

The '498 Application is also a continuation-in-part of U.S. patent application Ser. No. 14/717,112, filed May 20, 2015, and entitled "BARCODE READER".

This application claims priority from all of the applications listed above, which are incorporated by reference as if fully set forth herein.

TECHNICAL FIELD

The present disclosure relates generally to a barcode reader and a mobile device having a barcode-reading capability. More specifically, the present disclosure relates to a barcode reader that includes a three-dimensional semiconductor package and an optic system for reading a barcode.

BACKGROUND

Smartphones and other types of portable, hand-held computing devices, such as tablet computers, are in widespread use today, most often in connection with entertainment, communications and office productivity. Most smartphones include a camera, and applications have been developed for using the camera for both general purpose photography as well as reading barcodes. In a typical barcode reading application an image feed from the camera is displayed on the display screen of the smartphone to enable the user to align the camera with the barcode. When aligned, the image is decoded.

A problem exists in that the general purpose camera is not typically optimized for barcode reading and the position of the field of view of the general purposes camera (typically to the backside of the mobile device) is not optimized for barcode reading. What is needed is a camera system optimized for barcode reading.

SUMMARY

This patent specification relates generally to a mobile device having barcode-reading capabilities. The mobile device may include a barcode reader utilizing the teachings described herein. The barcode reader utilizing the teachings described herein may be implemented utilizing the general purpose camera of the mobile device or may be implemented utilizing an auxiliary camera, separate and distinct from the general purpose camera.

In one embodiment, the barcode reader may include a semiconductor package and an optic system. The semiconductor package may include a plurality of stacked silicon dies, wherein a first die positioned on top of the plurality of stacked silicon dies includes a two-dimensional array of photo sensors and image read-out circuitry. The image read-out circuitry may be coupled to the two-dimensional array of photo sensors and configured to generate a frame of image data. The frame of image data may be a sequence of values, each value representing an intensity of illumination focused on one of the photo sensors.

The optic system is configured to focus an image of a barcode on the two-dimensional array of photo sensors. The optic system includes a lens assembly and a mirror. The mirror folds an optical path behind the lens assembly onto the array of photo sensors.

Both the lens assembly and the mirror are positioned above the two-dimensional array of photo sensors. The plurality of stacked silicon dies includes a second die comprising an image processing circuit configured to receive the frame of image data and perform image processing functions to generate at least one image data record from the frame of image data, and a buffer memory for storing the at least one image data record.

The first die may include an image processing circuit configured to receive the frame of image data and perform image processing functions to generate at least one image data record from the frame of image data, and a buffer memory for storing the at least one image data record.

The mirror may be a flat mirror. Alternatively, the mirror may be a convex mirror. The two-dimensional array of photo sensors may be used to capture the frame of image data using a rolling shutter mode of operation.

In accordance with another embodiment, a mobile device may include a semiconductor chip, a lens assembly, and a mirror. The semiconductor chip may include a two-dimensional array of photo sensors and image read-out circuitry configured to generate a frame of image data representing an intensity of illumination focused on the two-dimensional array of photo sensors. The lens assembly is for capturing an image of a barcode positioned in a field of view of the lens assembly. The mirror is located behind the lens assembly for reflecting the illumination received via the lens assembly onto the two-dimensional array of photo sensors. Both the lens assembly and the mirror are positioned above the two-dimensional array of photo sensors.

The semiconductor chip may include an image processing circuit configured to receive the frame of image data and perform image processing functions to generate at least one image data record from the frame of image data.

The image read-out circuitry may be configured to sequentially commence exposure for each row of pixels of the two-dimensional array of photo sensors from a first row to a last row of the two-dimensional array of photo sensors. Each row of pixels is exposed from an exposure start time to an exposure end time for the row for a duration of an exposure period.

The semiconductor chip is positioned on top of a stack of multiple semiconductor chips that are stacked vertically and inter-connected by through-silicon vias (TSVs). The mirror may be either a flat mirror or a convex mirror.

In accordance with another embodiment, a barcode reader may include a three-dimensional (3D) integrated circuit (IC) package comprising a plurality of semiconductor chips including a first chip and a second chip that are stacked vertically and inter-connected using through-silicon vias. The first chip is located on top of the 3D IC package and comprises a two-dimensional array of photo sensors and image read-out circuitry configured to generate a frame of image data representing an intensity of illumination focused on the two-dimensional array of photo sensors. The barcode reader also includes an optic system including a lens assembly and a mirror. Both the lens assembly and the mirror are positioned above the two-dimensional array of photo sensors for focusing an image of a barcode captured by the lens assembly on the two-dimensional array of photo sensors. The mirror is located behind the lens assembly and folds an optical path onto the two-dimensional array of photo sensors.

At least one of the first chip or the second chip includes image pre-processing circuits configured to perform image processing functions to generate at least one image data record from the frame of image data. Each image data record is a derivative of the frame of image data. Each image data record may be generated by applying a distinct image processing convolution kernel to the frame of image data. Each image data record may be generated by applying a convolution kernel to both: i) the frame of image data, and ii) a reduced resolution image resulting from reducing resolution of the frame of image data by sub-sampling or binning.

The second chip may include a processor for running a barcode-reading application that is configured to provide control settings for the image read-out circuitry and the image pre-processing circuits on the first chip.

The mirror may be either a flat mirror or a convex mirror. The image read-out circuitry may be configured to sequentially commence exposure for each row of pixels of the two-dimensional array of photo sensors from a first row to a last row of the two-dimensional array of photo sensors. Each row of pixels is exposed from an exposure start time to an exposure end time for the row for a duration of an exposure period.

The first chip may include image processing circuits configured to perform image processing functions to generate at least one image data record from the frame of image data, and the second chip may include a decoder for decoding the image data record.

The barcode reader may be a part of a mobile device. In one embodiment, the second chip may include a decoder, an image processing module, and a license; and may output decoded data to the mobile device. Alternatively, the second chip may output an image data record to the mobile device for further processing and decoding by an image processing module and a decoder in the mobile device.

BRIEF DESCRIPTION OF THE DRAWINGS

FIGS. 2B and 2C illustrate a back side surface and a face surface of an exemplary mobile device that may be used in the barcode-reading system.

FIGS. 9A-9D show examples of pre-processing in accordance with some embodiments of the present disclosure.
FIGS. 10A and 10B show examples of a frame of image data generated with different settings in accordance with embodiments of the present disclosure.
FIG. 11 shows exemplary derivatives of a frame of image data produced by permutations of pre-processing circuits and/or an image processing module.
FIG. 16C depicts an exemplary database for recording pre-paid licenses that may have been purchased by an individual, organization, company or other group of users.
FIGS. 17A and 17B are schematic plan and elevation views, respectively, of an example of an integrated circuit package in accordance with one embodiment.

DETAILED DESCRIPTION

Figure 1:
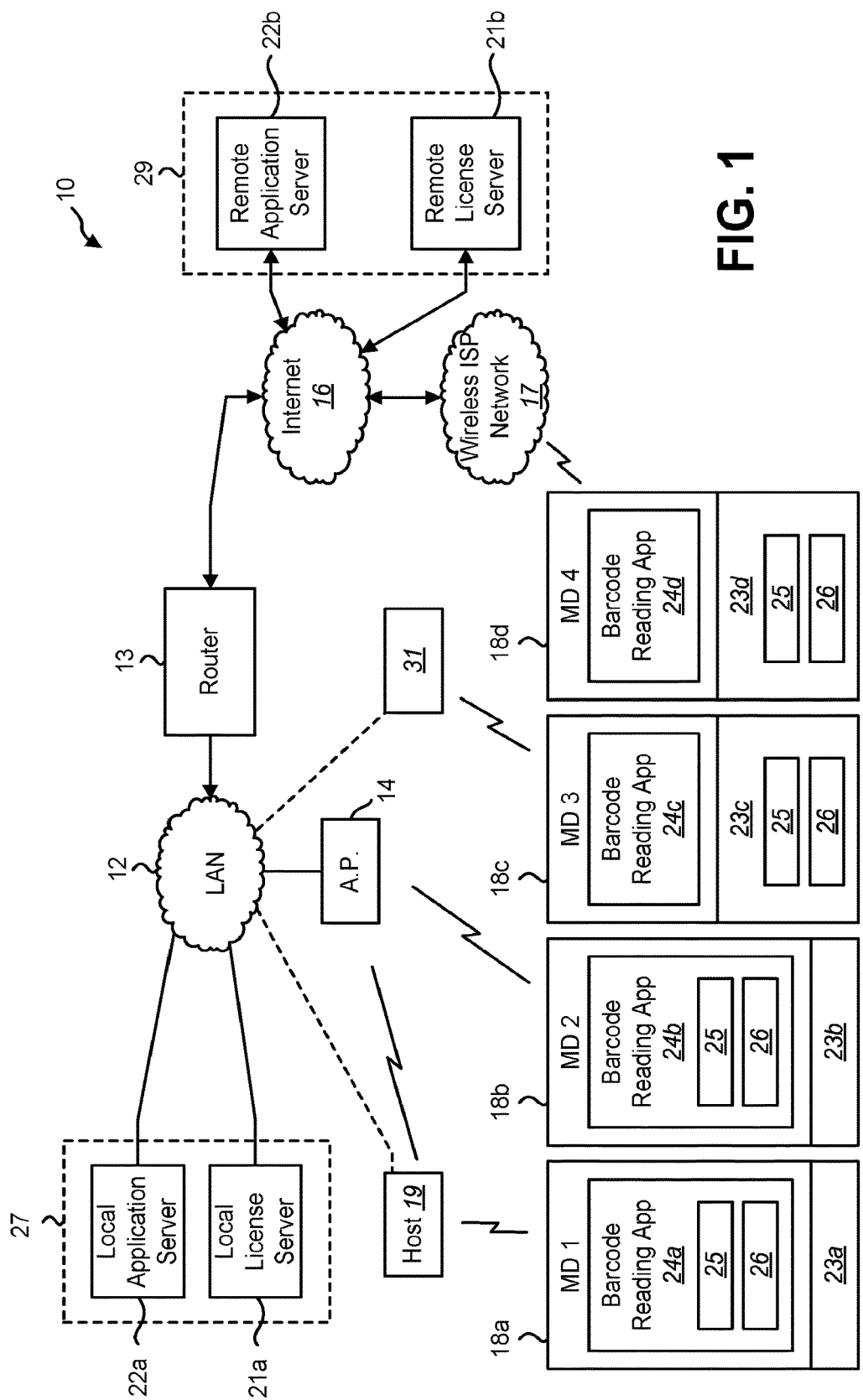
FIG. 1 illustrates an example of a barcode-reading system.

FIG. 1 depicts a system 10 according to one embodiment of the present application including one or more mobile devices 18*a*-18*d*. Each mobile device 18*a*-18*d* may include an imaging-based barcode reader module 23*a*-23*d* and may: i) obtain at least one barcode-reading application 24 from an application server 22*a* or 22*b*; and ii) obtain licensing (e.g., a license key 26) necessary for the operation of a decoder 25 present within at least one of the barcode reader module 23*a*-23*d* and the barcode-reading application 24*a*-24*d* of the mobile devices 18*a*-18*d* from a licensing server 21*a* or 21*b*.

As used in this patent specification and the accompanying claims, the term "mobile device" will be used to describe a portable, hand-held computing device that comprises an imaging-based barcode reader module and may also include a general-purpose camera.

The imaging-based barcode reader module 23a-23d may comprise a camera optimized for capturing an image of a barcode as well as image processing systems (implemented in at least one of hardware and software) optimized for barcode reading. The imaging-based barcode reader module 23a-23d, although within the housing of the mobile device 18a-18d, may architecturally be a peripheral to the computer system of the mobile device 18a-18d (e.g., coupled to the computer system of the mobile device 18a-18d via a communications port). In some embodiments, the imaging-based barcode reader module 23c and 23d may include a decoder 25 and output decoded data to the computer system of the mobile device 18c and 18d for use by the barcode-reading application 24c and 24d (e.g., a decoded barcode reader module). In other embodiments, the imaging-based barcode reader module 23a and 23b may output image data (as described below) to the mobile device 18a and 18b for decoding by a decoder 25 which is part of, associated with, or called by, the barcode-reading application 24a and 24b (e.g., an un-decoded barcode-reading module).

As indicated above, one example of such a mobile device 18a-18d is a smartphone with an integrated barcode-reading module. Another example of a mobile device 18a-18d is a tablet computer with an integrated barcode-reading module. Yet another example of a mobile device 18a-18d is a hybrid tablet/smartphone device with an integrated barcode-reading module, often nicknamed a "phablet."

The application server may be, for example, a local application server 22a or a remote application server 22b. Similarly, the license server may be a local license server 21a or a remote license server 21b. The application server 22a-22b and the license server 21a-21b may operate on distinct hardware or may operate on the same hardware server. For example, the local application server 22a and the local license server 21a may operate on the same hardware server 27 or on distinct hardware servers, each coupled to a local area network (LAN) 12. Similarly, the remote application server 22b and the remote license server 21b may operate on the same hardware server 29 or on distinct hardware servers, each coupled to the Internet 16.

The system 10 may include an LAN 12 to which each of the local application server 22a and the local license server 21a are connected. The LAN 12 may further include at least one wireless access point 14, enabling LAN communications with mobile devices (for example, mobile devices 18b and 18c) as well as other computing systems such as a host computer 19 and/or a charging station 31 (e.g., a station for providing power to the mobile device 18 for charging its battery).

The LAN 12 may be coupled to the Internet 16 via a router 13. Although FIG. 1 depicts the LAN 12 coupled to the Internet 16 via a single router 13, such connections may employ multiple routers and firewall systems, including demilitarized zone (DMZ) networks.

Figure 2A:
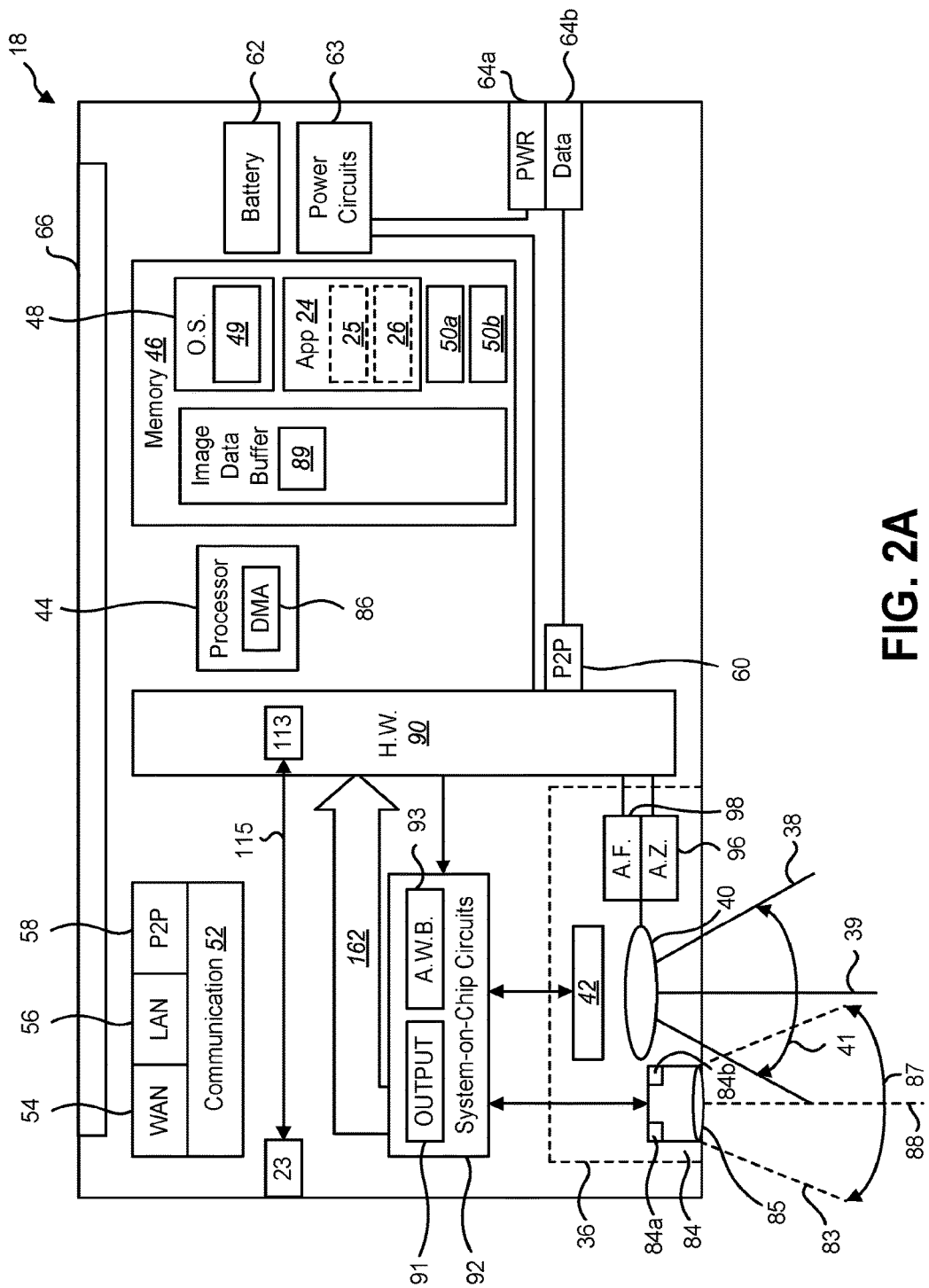
FIG. 2A is a block diagram of an exemplary mobile device useful in a barcode-reading system.

Referring to FIG. 2A in conjunction with FIG. 1, each of the mobile devices 18a-18d may include a wireless communication system 52 for operating within a wireless network environment. The wireless communication system 52 may comprise any permutation of: i) a local area network (LAN) communications module 56, ii) a wide area network (WAN) communications module 54, and/or iii) a wireless point-to-point communication interface 58.

The LAN communications module 56 may utilize Wi-Fi™ (IEEE 802.11) or similar wireless local area communication protocols for communication with a wireless access point 14 of a wireless portion of an LAN 12, such that the mobile device 18a-18d itself may be an addressable endpoint on the LAN 12, i.e., the mobile device 18a-18d may be assigned an IP address and may be capable of IP communications with other devices over the LAN 12 using IP protocols such as Transmission Connection Protocol (TCP), Uniform Datagram Protocol (UDP), etc. The wireless access point 14 and the LAN communications module 56 may function in accordance with any known wireless communications protocol, including but not limited to the IEEE 802.11 standards, which are sometimes referred to as Wi-Fi™. As will be discussed in more detail, a mobile device, 18b for example, utilizing its LAN communications module 56 may obtain at least one barcode-reading application 24 from an application server 22a or 22b and its license key from a license server 21a or 21b via the LAN 12 and/or, as applicable, the Internet 16.

The WAN communications module 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN communications module 54 may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the mobile device such that the mobile device may be capable of IP communications with other devices over the wireless ISP network 17 using IP protocols such as TCP, UDP, or the like.

Remote devices (e.g., devices coupled to the Internet 16) may be logically connected to the LAN 12 using a Virtual Private Network (VPN) technology. As such, a mobile device, 18d for example, coupled to communicate with the wireless ISP network 17 utilizing its WAN communications module 54 may, utilizing a VPN technology, be an endpoint on the LAN 12. As such, a mobile device 18 may obtain at least one barcode-reading application 24 from the remote application server 22b (or local application server 22a utilizing VPN technologies) and its license key 26 from the remote license server 21b (or the local license server 21a utilizing VPN technologies) via the wireless ISP network 17 and, as applicable, the Internet 16.

The wireless point-to-point communication interface 58 may form a wireless point-to-point communication link with another compatible system, such as a host computer 19 and/or a charging station 31, utilizing Bluetooth® or similar wireless point-to-point communication protocols. The host computer 19 and/or the charging station 31 in turn includes a wired and/or wireless LAN interface for communication with a switch (not shown) or the wireless access point 14 of the LAN 12 such that the host computer 19 may be an addressable endpoint on the LAN 12. As will be discussed in more detail, a mobile device, 18a or 18c for example, coupled to communicate with the host computer 19 utilizing its wireless point-to-point communication interface 58 may obtain at least one barcode-reading application 24 from the application server 22a or 22b and its license key 26 from the license server 21a or 21b via its point-to-point connection to the host computer 19 and/or the charging station 21 which communicates with the servers 21a, 21b, 22a, 22b via the LAN 12 and/or, as applicable the Internet 16.

Figure 2D:
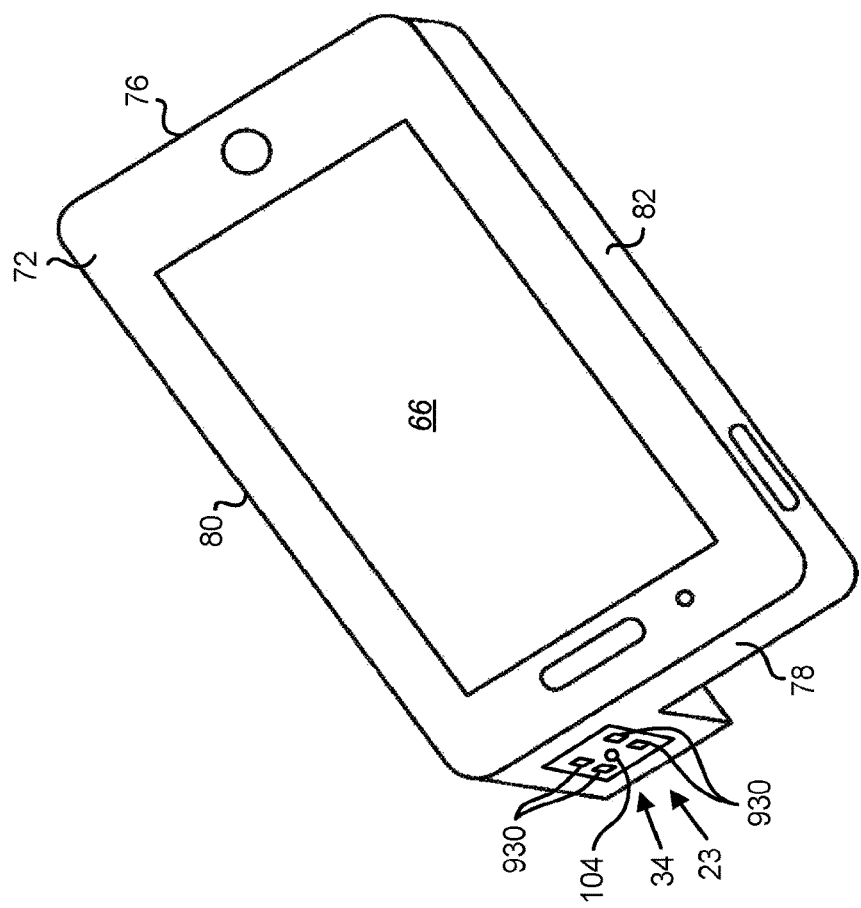
FIG. 2D illustrates an exemplary mobile device that may be used in the barcode-reading system.

FIGS. 2B and 2C illustrate a back surface and a face surface of an exemplary mobile device 18, respectively. FIG. 2D illustrates an exemplary mobile device that may be used in the barcode-reading system. Referring to FIGS. 2B, 2C and 2D, the mobile device 18 may comprise a housing 28 with a plurality of external surfaces such as a face surface 72 and a back surface 74 which is generally parallel to the face surface 72 and separated from the face surface 72 by four (4) edge surfaces (each orthogonal to, and extending about the perimeter of, both the face surface 72 and the back surface 74, including a bottom edge 76, a top edge 78 (which is parallel to the bottom edge 76), a right edge 80 and a left edge 82 (which is parallel to the right edge 80).

The face surface 72 may include a user interface such as a capacitive multi-touch display screen 66 (e.g., with a glass cover), which is shown in FIGS. 2A and 2D, and may define the face surface 72 of the housing 28.

Referring to FIGS. 2C and 2D, the nomenclature bottom edge 76, top edge 78, right edge 80, and left edge 82 have been chosen because they correspond to the bottom, top, right, and left sides of the display screen 66 of the mobile device 18 when the display screen 66 is operated in a portrait mode. Each of the right edge 80 and the left edge 82 may be of equal length and longer than each of the bottom edge 76 and the top edge 78 (which may also be of equal length).

As depicted in FIGS. 2B and 2D a portion 34 of the back surface 74 may be extended or "bumped out" to accommodate the imaging-based barcode reader module 23 within the interior of the mobile device 18. As will be discussed herein, one objective of the present invention is to provide a barcode reader module 23 with a sufficiently small size such that the portion 34 of the back surface 74 that is extended is minimal in size, or is not necessary at all.

Referring to FIG. 2A, the mobile device 18 may include a processor 44 and a memory 46. The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, the barcode-reading application 24 (which may include the decoder 25 and the license key 26), and one or more other applications 50a, 50b. The memory 46 may further include a data buffer including an image data buffer 89 for images from the general-purpose camera assembly 36 or images from the barcode reader module 23 in the embodiment wherein the barcode-reading application 24 is to receive image data from the barcode reader module 23 for decoding by a decoder 25 within the barcode-reading application 24.

In operation, the processor 44 may execute instructions embodied in the operating system 48, the barcode-reading application 24, and each of the other applications 50a, 50b. Hardware circuits 90 interface the processor 44 with peripheral systems including, but not limited to, the barcode reader module 23 (communicating to the processor 44 executing the barcode-reading application 24 through a communication circuit 113), a (multi-touch) display screen 66, a wireless communication system 52, a hardwired point-to-point communication interface 60, a general-purpose camera assembly 36, and a white light source 84 (e.g., an illuminator or a flash for utilizing the general-purpose camera assembly 36 for photography).

The hardwired point-to-point communication interface 60 may utilize Universal Asynchronous Receiver/Transmitter (UART), Universal Serial Bus (USB), and similar communication protocols for communicating with a compatible system connected to a data connector 64b (which may be a part of a single power/data connector 64 such as a USB connector or an Apple® Lightning Connector®).

Referring to FIG. 2A, the general-purpose camera assembly 36 may include a (color) photo sensor 42 (i.e., an array of image sensors) positioned parallel to each of the face surface 72 and the back surface 74 and a lens assembly 40 with an optical axis 39 orthogonal to the photo sensor 42 and defining a center line of a camera field of view 38 extending outward from the back surface 74 of the mobile device 18. The photo sensor 42 may include one or more sensors such as charge-coupled display (CCD) sensors, complementary metal-oxide-semiconductor (CMOS) sensors, or the like.

The lens assembly 40 may receive light reflected from objects within the camera field of view 38. The camera field of view 38 may have an angular size 41 which may be the angle at which the camera field of view 38 spreads with respect to distance from the lens assembly 40. The lens assembly 40 may have a camera aperture size measured as an f-number which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The general-purpose camera assembly 36 may further include an auto zoom module 96 and/or an autofocus module 98 which may serve to control an optical zoom setting and/or an autofocus setting of the camera, respectively. Autofocus and auto zoom may be controlled by moving the position of at least one of the lenses making up the lens assembly 40 with respect to each other (or with respect to the photo sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general-purpose photography, and may therefore not be ideal for barcode capture and/or decoding. More specifically, in a barcode-reading application an operator expects to read and decode a barcode in less than 300 ms. The focus and zoom adjustment process may require significantly more time and therefore, if used, it would significantly delay the response time in a barcode-reading application.

If the camera lens assembly 40 is fixed (e.g., not adjusted for focus and zoom) at any particular focus and/or zoom setting for the camera lens assembly 40, the combination of the angular size 41 and the camera aperture size affect the camera depth of field (e.g., the range of distances at which a barcode of a particular modular size is imaged onto the photo sensor with sufficient size and sharpness for decoding). The angular size 41 affects the minimum distance at which a barcode of a certain overall size can be imaged onto the photo sensor 42.

The photo sensor 42 may be coupled to system-on-chip circuits 92 which include an output module 91 and an auto-white balance module 93. In one embodiment, the output module 91 may control the operation of the photo sensor 42 (e.g., exposure, gain, and the coupling of pixels to analog-to-digital (A/D) converters for image read out), format the digital intensity values of each pixel of the photo sensor 42 for color image output, and make the color image output available for writing to the image data buffer 89.

The auto-white balance module 93 may perform auto-white balance algorithms on the captured image to enhance the quality of color photographs captured by the photo sensor 42 under different illumination conditions. The mobile device 18 may include a direct memory access (DMA) system 86 which may be a part of the processor 44. The DMA system 86 provides for direct writing of the digital image output 162 from the general-purpose camera assembly 36 to the image data buffer 89 for use by an application 50a, 50b (or the barcode-reading application 24) which is configured to receive image data from the general-purpose camera assembly 36.

The general-purpose camera assembly 36 may further include a white light source 84. The white light source 84 may include one or more light-emitting diodes (LEDs) 84a, 84b controlled by the system-on-chip circuits 92.

In an exemplary embodiment, a first LED 84a may be a white LED. The color of a white LED is typically described using a Kelvin temperature scale with 1500° K representing a warm color "white," such as that of candlelight, and 9500° K representing a cool color "white," such as that of a blue sky. The exemplary white LED may be within this range. Alternatively, the exemplary white LED may have a color between 4000° K and 7000° K.

In the exemplary embodiment the second LED 84b may be an amber LED emitting illumination within the 600-615 nm range. Both the first LED 84a and the second LED 84b may be positioned behind a common optic 85 which directs illumination within a field of illumination 83 projecting away from the back surface 74 and having an illumination axis 88 perpendicular to the back surface 74 and an illumination angle 87 which substantially coincides with the field of view 38 of the general-purpose camera assembly 36. In operation, the system-on-chip circuits 92 may control each LED 84a, 84b independently, and control the intensity of each LED 84a, 84b independently such that the color of the white illumination of the combined LEDs may be controlled by controlling the intensity of the amber LED with respect to the intensity of the white LED. If the intensity of the amber LED is higher, the white color of the combination will be warmer (lower Kelvin temperature). If the intensity of the amber LED is lower, the color approaches the Kelvin temperature of the white LED alone.

Figure 2E:
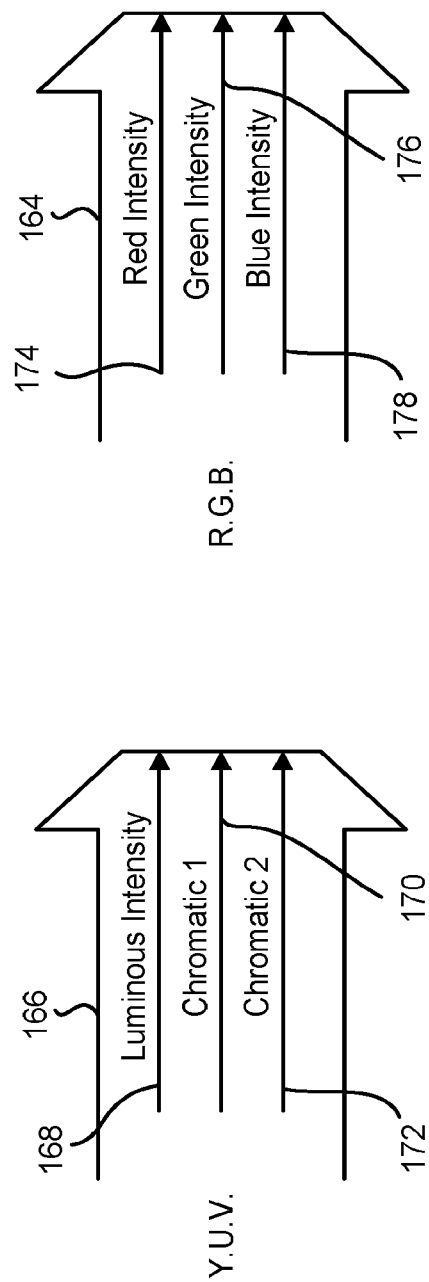
FIG. 2E shows an image output format.

FIG. 2E shows two exemplary image output formats. The image output format from the photo sensor 42 may be in either R.G.B. format 164 and/or Y.U.V. format 166. The Y.U.V. format 166 may include, for each pixel, a luminous intensity 168 indicative of the overall intensity of light incident on the pixel during the exposure period, a first chromatic 170 representative of a first dimension of color of the light incident on the pixel during the exposure period, and a second chromatic 172 representative of a second dimension of color incident on the pixel during the exposure period.

The R.G.B. format 164 may include, for each pixel, a red intensity value 174 indicating the intensity of red light incident on the pixel during the exposure period, a green intensity value 176 indicating the intensity of green light incident on the pixel during the exposure period, and a blue intensity value 178 indicating the intensity of blue light incident on the pixel during the exposure period.

Returning to FIG. 2A, the mobile device 18 may further include a battery 62 and power circuits 63. In general the power circuits 63 control charging of the battery 62 from power received from an external power source via the power connector 64a and providing operating power at the voltage and current drawing requirements of the various components of the mobile device 18 from the power received from the battery 62 or the external power source (when connected to the external power source).

Figure 3:
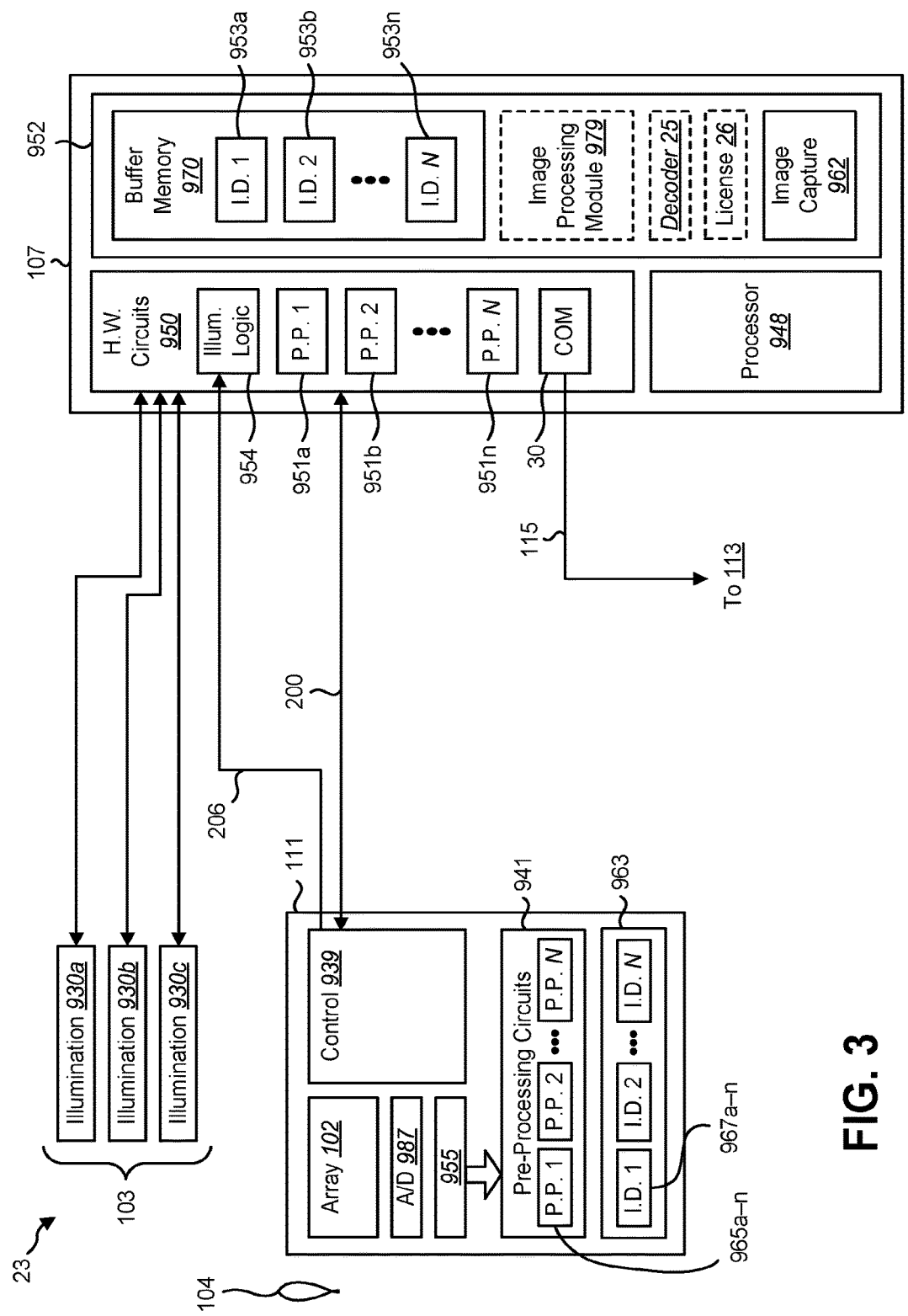
FIG. 3 depicts a block diagram representative of a barcode reader module in accordance with one embodiment of the present disclosure.

FIG. 3 is a block diagram representative of an exemplary barcode reader module 23. The barcode reader module 23 may include an image capture control and output system 107 in combination with an image sensor system 111, and an illumination system 103.

The image sensor system 111 and the image capture control and output system 107 may be included in two separate packages, each of which may include one or more silicon dies. Alternatively, the image sensor system 111 and the image capture control and output system 107 may be separate silicon dies (separate silicon layers 71a-71d) within the same system package 73, which will be discussed in more detail with respect to FIGS. 17A and 17B.

Illumination Systems

The illumination system 103 includes one or more illumination sub-systems 930a-c, each of which may have different illumination characteristics. Some examples of different illumination characteristics include the angle of illumination with respect to an optical axis, the intensity of illumination, the wavelength of illumination, diffusion characteristics of the illumination, the illumination profile which may include the intensity of the illumination within a two-dimensional plane spaced from the barcode reader 100 or the three-dimensional shape within the field of view at which illumination emitted by the illumination sub-system has a predetermined intensity, etc.

It should be noted that the number of illumination sub-systems 930a-c shown in FIG. 3 and the characteristics of each illumination sub-system disclosed herein are provided only as an example. In an alternative configuration, the barcode reader module 23 may include more than three (or any number of) different illumination sub-systems, and the illumination sub-systems may provide illumination having different illumination characteristics (e.g., by changing the intensity, wavelength, angle, diffusion characteristics of the illumination, illumination profile characteristics, or the like).

Image Capture Control and Output System

The image capture control and output system 107 may include: i) a processor 948; ii) a memory 952; and iii) hardware circuits 950 for coupling to, and driving operation of, the illumination system 103 and the image sensor system 111.

The processor 948, as described, may be a general-purpose single or multi-die microprocessor (e.g., an ARM), a special purpose microprocessor (e.g., a digital signal processor (DSP)), a microcontroller, a programmable gate array, etc. The processor 948 may be referred to as a central processing unit (CPU). Although just a single processor 948 is shown in FIG. 3, in an alternative configuration, a combination of processors (e.g., an ARM and DSP) may be used.

The hardware circuits 950 provide the interface between the image capture control and output system 107, the illumination system 103, the communication circuits 113 of the mobile device 18, and the image sensor system 111. The hardware circuits 950 may further include illumination logic 954 and pre-processing circuits 951*a-n*, each of which will be described in more detail herein.

The memory 952, as described, may be any combination of non-volatile memory or storage and volatile memory or storage. The memory 952 may include an image capture module 962, an image buffer 970, and, if a decoded barcode reader module, an image processing module 979, and a decoder 25. These components may be stored in any combination of volatile and non-volatile memory. Some modules may be stored in both volatile and non-volatile memory, for example, with permanent storage of the module in non-volatile memory and a temporary copy stored in volatile memory for execution by the processor 948 following boot up. In addition to, or as an alternative to, these modules, the memory 952 may store any number of other modules including, but not limited to, those set forth in the patent applications incorporated by reference in this disclosure. A more detailed description of the image capture control and output system 107 is included herein.

Image Sensor System

The image sensor system 111 may include: i) a two-dimensional photo sensor array 102 onto which illumination from a field of view of the barcode reader module 23 is focused by the optic system 104; ii) hardware gate logic 941 implementing one or more pre-processing circuits 965*a-n*; iii) volatile memory or storage such as random access memory implementing an image buffer 963; iv) hardware gate logic implementing wide bus logic 955 for transferring each image frame captured by the photo sensor array 102 to the hardware gate logic 941 (or the image buffer 963); and v) control circuitry 939 which may include a combination of gate logic, volatile memory or storage, and a processor executing code stored in the memory for implementing control of the photo sensor array 102 (image read-out), the wide bus logic 955, the hardware gate logic 941, the image buffer 963, and transfer of image data records to the image capture control and output system 107.

Photo Sensor Array

The photo sensor array 102 may comprise a two-dimensional rolling shutter array of pixels with each pixel comprising an active photosensitive region capable of measuring or quantifying the intensity of illumination incident on the pixel fabricated, for example, using known complementary metal oxide semiconductor (CMOS) sensor technology. Each pixel may be a photodiode which accumulates charge over the duration of an exposure period. Prior to commencement of the exposure period the photodiode may be coupled to ground to dissipate an accumulated charge and the exposure period for the pixel may commence when the photodiode is de-coupled from ground so that a charge accumulates in proportion to the intensity of illumination incident on the pixel. The charge on the photodiode continues to accumulate so long as illumination is incident on the photodiode. The exposure period ends when the accumulated charge is measured by an analog-to-digital (A/D) converter 987.

In one embodiment, the photodiode may couple to the input of an A/D converter 987 when the control circuitry 939 generates a read signal and, upon coupling of the photodiode to the A/D converter 987, the A/D converter 987 generates a digital value representative of the accumulated charge at the time the photodiode is coupled to the A/D converter 987 which is input to a register of the wide bus logic 955 for transfer to the pre-processing circuits 965*a-n* (or the image buffer 963).

In another embodiment, the photodiode may be coupled to the input of an A/D converter 987 prior to the end of the exposure period. In this embodiment, the A/D converter 987 may be continually making a digital value representative of the accumulating charge available at its output port with that digital value continually increasing as charge accumulates on the photodiode (i.e., periodically updating the digital value to represent the increasing voltage as charge accumulates on the photodiode). In this embodiment when the control circuitry 939 generates a read signal the then current digital value (at the time of the read signal) is read or input to a register of the wide bus logic 955 for transfer to the pre-processing circuits 965*a-n* (or the image buffer 963).

In order to improve sensitivity of the photo sensor array 102, the pixels may not include a masked charge storage region associated with each photosensitive region for temporarily holding accumulated charge from the photodiode region prior to coupling the charge from the photodiode to the A/D converter 987. Directly coupling the photosensitive region to the A/D converter 987 means that there is no charge storage region separate from the photodiode on which charge is accumulating. Stated another way, in neither of the foregoing embodiments is the accumulated charge on the photodiode buffered, as an analog charge or otherwise, prior to being coupled to the A/D converter 987. Stated in yet another way, in neither of the foregoing embodiments is accumulation of the charge stopped, or the accumulated charge otherwise made static (i.e., no more accumulation) prior to being coupled to the A/D converter 987.

Figure 4:
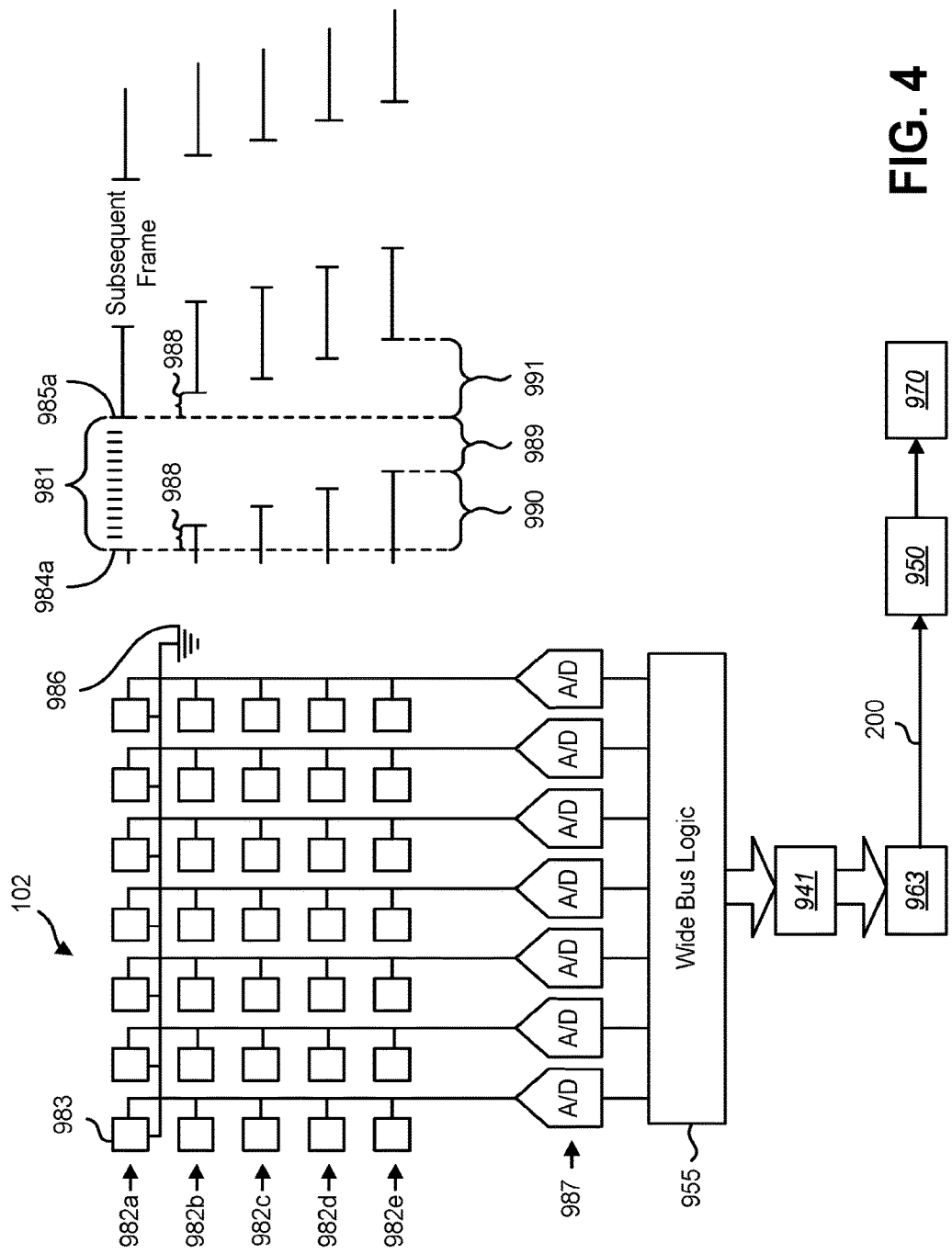
FIG. 4 shows image read-out circuitry and an operation of an image reading out in accordance with one embodiment of the present disclosure.

FIG. 4 depicts a photo sensor array 102 with A/D converters 987 and an image capture operation in accordance with one embodiment of the present disclosure. The photo sensor array 102 may comprise a plurality of rows of pixels 982*a-e* and one A/D converter 987 per column of pixels such that each pixel in an entire row may have a simultaneous exposure period end time and may be simultaneously coupled to a corresponding A/D converter 987 which generates the digital value at the end of the exposure period applicable to the pixel.

In the exemplary embodiment wherein there is one A/D converter per column, the photo sensor array 102 may be operative such that exposure of the rows of pixels 982*a-e* is initiated, and subsequently terminated, sequentially from the first of the plurality of rows (e.g., row 982*a*) to the last of the plurality of rows (e.g., row 982*e*), one row at a time from either the top of the photo sensor array 102 to the bottom of the photo sensor array 102 or from a top row within a cropped window of the photo sensor array 102 to the bottom row within the cropped window of the photo sensor array 102.

More specifically, using row 982*a* at a top of the photo sensor array 102 as an example, the exposure period begins at a start of an exposure period 984*a* and the end of the exposure period 985*a*. The start of the exposure period 984*a* begins when the photosensitive region 983 of each pixel within the row is contacted with the ground 986 to dissipate any charge which may have accumulated on the photosensitive region 983 prior to the beginning of the exposure period. The end of the exposure period 985*a* is when the photosensitive region 983 of each pixel in the row is coupled directly to an A/D converter 987 and the A/D converter 987 generates a digital intensity value (digital value) representative of the accumulated charge. The digital intensity value for each pixel within the row may be written to a register of the wide bus logic 955 for output to the pre-processing circuits 965*a-n* or directly to the image buffer 963.

It should be appreciated that one row of pixels at a time may be simultaneously exposed (simultaneous commencement and subsequent simultaneous termination of an exposure period). The next row of pixels may then have a simultaneous exposure period that does not require termination (e.g., coupling of each pixel to an A/D converter) until the A/D converters 987 have completed operation on the previous row. The time required for an A/D converter 987 to produce a digital value representative of accumulated charge may be referred to as the A/D converter cycle time. When the quantity of A/D converters 987 is equal to the number of columns the minimum read-out time for all rows would be the number of rows multiplied by the A/D converter cycle time.

In more detail, the start of exposure for each row is initiated at a predetermined amount of time 988 following the start of exposure for the immediately preceding row and the end of exposure for each row occurs at the predetermined amount of time 988 following the end of exposure for the immediately preceding row. The predetermined amount of time 988 may be greater than the time required for each pixel in the row to be coupled to its A/D converter 987, the intensity value to be written to the register of the wide bus logic 955, and the register value to be output to the pre-processing circuits 965*a-n* or written to the image buffer 963. In the exemplary embodiment, each row of pixels is subject to an exposure period long enough, and read out fast enough, such that the exposure period is initiated for the last row of pixels 982*e* of the photo sensor array 102 prior to the end of the exposure period (i.e., when read-out commences) for the first row of pixels 982*a* of the photo sensor array 102 such that a time period 989 exists when all rows are being simultaneously exposed.

As such, the total exposure period for the array of pixels comprises: i) a first period 990 being the time between when exposure of the first row of the array is initiated and exposure of the last row of the array is initiated; ii) a second time period 989 being the time when all rows are being simultaneously exposed; and iii) a third period 991 being the time between when read-out of the first row of the array is initiated and read-out of the last row is initiated (i.e., the time between when exposure of the first row ends and exposure of the last row of the array ends). In one embodiment, the total exposure period for any particular row remains less than 20 ms. In another embodiment, the total period from the start of exposure for the first row and the end of exposure for the last row may be less than 20 ms.

In one embodiment, the exposure period 981 may be expressed as a quantity of rows of the image sensor array. The total exposure time may be expressed as the number of rows multiplied by the time 988 required to read out a row. Stated another way, when the exposure period 981 is expressed as a quantity of rows, the numerical value for the exposure period is the quantity of rows between the row that is then currently commencing its exposure period and the row that is then currently being read out (ending exposure period). When the exposure period is very short (i.e., a quantity of rows less than the total quantity of rows in the array) read-out of the rows that first started exposure (for example at the top of the array if exposure runs from the top to the bottom) commences before rows at the bottom of the array begin exposure. However, as described above, in the exemplary embodiment, read-out is very fast such that the exposure period, when expressed as a quantity of rows, will be a numerical value greater than the total number of rows in the photo sensor array 102.

While FIG. 4 depicts one A/D converter 987 per column, it should be appreciated that other configurations may include fewer or more A/D converters 987 (i.e., fewer than one A/D converter 987 per column or more than one A/D converter 987 per column). The quantity of A/D converters may define the quantity of pixels for which the exposure period may simultaneously end (e.g., the quantity of pixels for which the accumulated charge may be simultaneously converted to a corresponding digital value).

As another example, if the quantity of A/D converters is equal to half the number of columns, one-half of a row of pixels may be simultaneously exposed. The next one-half row of pixels may then have a simultaneous exposure period that does not require termination until the A/D converters have completed operation on the previous one-half row. If the quantity of A/D converters is equal to one-half the number of columns it would require two A/D converter read-out cycles to read out each row and the minimum read-out time for all rows would be the number of rows multiplied by two and then multiplied by the A/D converter cycle time.

Figure 5:
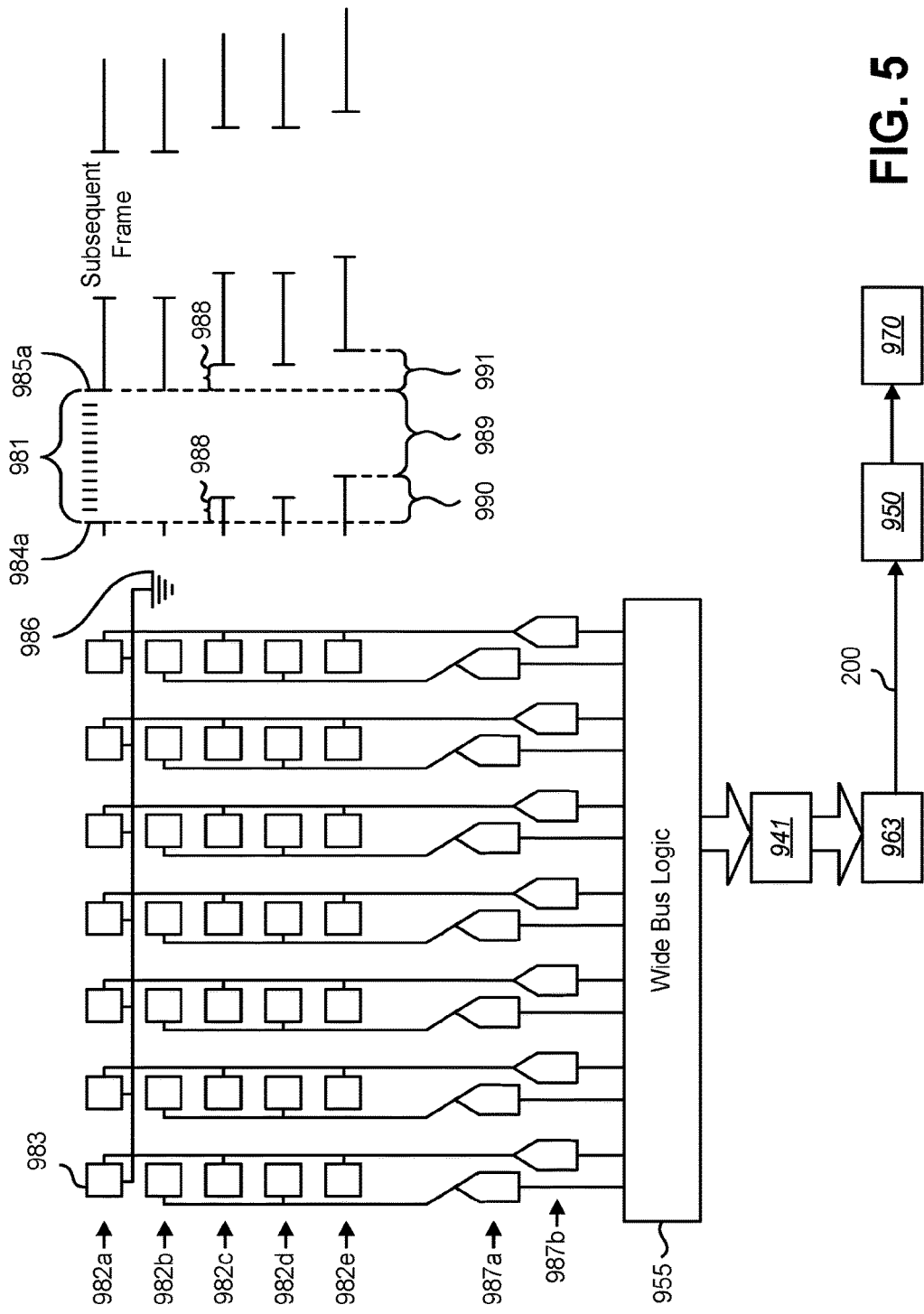
FIG. 5 shows image read-out circuitry and an operation of an image reading out in accordance with another embodiment of the present disclosure.

Similarly, as depicted in FIG. 5, the quantity of A/D converters 987*a* and 987*b* may be equal to twice the number of columns (arranged in two banks of A/D converters 987*a* and 987*b*). In this exemplary embodiment, there is a sufficient quantity of A/D converters to read out two rows simultaneously. Each bank of A/D converters 987*a* and 987*b* is connected to, and operates on, every other alternating row of pixels. As such, the photo sensor array 102 may be operative such that exposure of the rows of pixels 982*a-e* is initiated, and subsequently terminated, sequentially in two-row groups from the first group of rows (e.g., row 982*a-b*) to the last of the plurality of rows (e.g., the group including rows 982*d-e*).

More specifically, using rows 982*a* and 982*b* at a top of the photo sensor array 102 as an example, the exposure period begins at a start of an exposure period 984*a* and ends at the end of the exposure period 985*a*. The start of the exposure period 984*a* begins when the photosensitive region 983 of each pixel within the two rows is contacted with the ground 986 to dissipate any charge which may have accumulated on the photosensitive region 983 prior to the beginning of the exposure period. The end of the exposure period 985*a* is when the photosensitive region 983 of each pixel in the two rows is coupled directly to an A/D converter 987*a*, 987*b* and the A/D converters 987*a*, 987*b* generate a digital intensity value (digital value) representative of the accumulated charge. The digital intensity value for each pixel within the two rows may be written to a register of the wide bus logic 955 for output to the pre-processing circuits 965*a-n* or directly to the image buffer 963.

It should be appreciated that in this embodiment two rows of pixels at a time may be simultaneously exposed (simultaneous commencement and subsequent simultaneous termination of an exposure period). The next group of two rows of pixels may then have a simultaneous exposure period that does not require termination (e.g., coupling of each pixel to an A/D converter 987*a*, 987*b*) until the A/D converters 987*a*, 987*b* have completed operation on the previous group of two rows. Again, the time required for an A/D converter to produce a digital value representative of accumulated charge may be referred to as the A/D converter cycle time. When the quantity of A/D converters is equal to twice the number of columns the minimum read-out time for all rows would be one half the number of rows multiplied by the A/D converter cycle time.

In more detail, the start of exposure for each group of two rows is initiated at a predetermined amount of time 988 following the start of exposure for the immediately preceding group of two rows, and the end of exposure for each group of two rows occurs at the predetermined amount of time 988 following the end of exposure for the immediately preceding group of two rows.

The predetermined amount of time 988 may be greater than the time required for each pixel in the group of two rows to be coupled to its A/D converter 987, the intensity value to be written to the register of the wide bus logic 955, and the register value to be output to the pre-processing circuits 965*a-n* or written to the image buffer 963. In the exemplary embodiment, each pixel within the group of two rows is subject to an exposure period long enough, and read out fast enough, such that the exposure period is initiated for the last group of two rows of pixels 982*d-e* of the photo sensor array 102 prior to the end of the exposure period (i.e., when read-out commences) for the first group of two rows of pixels 982*a-b* of the photo sensor array 102 such that a time period 989 exists when all rows are being simultaneously exposed.

As such, the total exposure period for the array of pixels comprises: i) a first period 990 being the time between when exposure of the first group of two rows of the array is initiated and exposure of the last group of two rows of the array is initiated; ii) a second time period 989 being the time when all rows are being simultaneously exposed; and iii) a third period 991 being the time between when read-out of the first group of two rows of the array is initiated and read-out of the last group of two rows is initiated (i.e., the time between when exposure of the first group of two rows ends and exposure of the last group of two rows of the array ends).

In one embodiment, the total exposure period for any particular group of two rows remains less than 20 ms. Alternatively, the total period from the start of exposure for the first group of two rows and the end of exposure for the last group of two rows may be less than 20 ms.

Windowing, Binning, Sub Sampling (Read-Out Level)

The term image frame, as used herein, may be a full image frame, a binned image frame, a sub-sampled image frame, or a window of any of a full, binned, or sub-sampled image frame.

As used herein, the term "full image frame" refers to an image frame that is captured when an entire photo sensor array 102 is exposed and read-out. Thus, a full image frame may include pixels corresponding to all of the photo sensors in the photo sensor array 102.

As used herein, the term "binned image frame" refers to an image frame that is captured by simultaneously combining the photodiodes for multiple adjacent pixels to a single A/D converter 987 (effectively creating a single pixel with a larger photosensitive region comprising the photosensitive regions of the combined pixels, but an overall lower resolution for the image frame). Common binning may include combining groups of two adjacent pixels horizontally, groups of two adjacent pixels vertically, and two-by-two groups of pixels as depicted in FIG. 9A. The resolution values of the image capture parameter values for an image frame that is to be captured as a binned image frame will define the binning (how adjacent pixels are to be grouped).

As used herein the term "sub-sampled image frame" refers to an image frame that is captured at a lower resolution utilizing a pattern of fewer than all of the pixels applied across the full photo sensor, for example every second pixel or every fourth pixel. The used pixels are read out while the un-used pixels are not read out or the data is ignored. The resolution values of the image capture parameter values for an image frame that is to be captured as a sub-sampled image frame will define the sub-sampling ratio of pixels which are read and used versus un-used pixels.

As used herein the term "a window of an image frame" refers to a portion of a full image frame, a binned image frame, or a sub-sampled image frame that is smaller than the full photo sensor array image, either by vertical cropping, horizontal cropping, or both. The portions of the pixels outside of the cropping may not be read out. The image capture parameter values for an image frame that is to be captured as a windowed image frame (full, binned, or sub-sampled) will define the horizontal and vertical cropping, as applicable.

It should be appreciated that binning, subsampling, and windowing may be performed by the photo sensor array 102 at read-out such that the resulting image frame (full, binned, sub-sampled, and/or windowed) is the image frame input to the pre-processing circuits 965*a-n*.

Wide Bus Logic

To enable digital values representative of illumination on pixels to be transferred very quickly from the A/D converters 987 to the pre-processing circuits 965*a-n* (or written directly to the image buffer 963) wide bus logic 955 may transfer the digital intensity values from all A/D converters 987 to the pre-processing circuits 965*a-n* (or the image buffer 963) in parallel (e.g., the same clocking cycles transfer all digital intensity values from all A/D converters 987 to the pre-processing circuits 965*a-n* (or the image buffer 963) simultaneously).

Stated another way, the wide bus logic 955 may include transfer logic modules, each implementing a channel for transfer of a digital intensity value from an A/D converter 987 to the pre-processing circuits 965*a-n* (or the image buffer 963), with the quantity of transfer logic modules being equal to the quantity of A/D converters, and with each distinct transfer logic module being coupled to the output of one distinct A/D converter. Stated yet another way, the wide bus logic 955 may implement a digital intensity value transfer bus (from the A/D converters 987 to the pre-processing circuits 965*a-n* (or the image buffer 963) that is as wide as the number of A/D converters 987.

Alternatively, the width of the wide bus logic 955 may be 50% of the number of A/D converters 987, in which case it would take two bus cycles to transfer all digital intensity values from all A/D converters 987 to the pre-processing circuits 965*a-n* or to the image buffer 963. Alternatively, the width of the wide bus logic 955 may be 25% of the number of A/D converters 987, in which case it would take four bus cycles to transfer all digital intensity values from all A/D converters 987 to the pre-processing circuits 965*a-n* or to the image buffer 963. It should be noted that the width of the wide bus logic 955 may be any percentage of the number of columns of the photo sensor array (i.e., the number of A/D converters 987). However, if an entire row of pixels is to undergo a simultaneous exposure period utilizing a quantity of A/D converters equal to the number of pixels in the row, but the bus logic 955 is not sufficient to transfer digital intensity values from all A/D converters simultaneously, the bus logic 955 may include first-in-first-out (FIFO) buffers (one FIFO buffer for each A/D converter) for buffering digital intensity values prior to transfer to the pre-processing circuits 965*a-n* or to the image buffer 963.

Pre-Processing Circuits

Returning to FIG. 3, the hardware gate logic 941 includes multiple pre-processing circuits 965a-n. The pre-processing circuits 965a-n may perform operations such as convolution, binning, sub-sampling, cropping, and other image processing functions on an image frame (full, binned, sub-sampled, and/or cropped) to generate one or more image data records 967a-n, each of which is derived from the image frame or an image data record that was previously derived from the image frame.

Each pre-processing circuit 965a-n may receive as input either: i) an image frame (full, binned, sub-sampled, and/or cropped) received directly from the photo sensor array 102 by way of the wide bus logic 955; or ii) an image data record 967a-n from the image buffer 963 which is the result of a different pre-processing circuit 965a-n previously operating on an image frame (full, binned, sub-sampled, and/or cropped) received directly from the photo sensor array 102 by way of the wide bus logic 955.

It should be noted that one image frame (full, binned, sub-sampled, and/or cropped) may be input to multiple pre-processing circuits 965a-n resulting in multiple image data records 967a-n being written to the image buffer 963 for the same frame of image data. Further, for a burst of multiple image frames (described herein), each image frame (full, binned, sub-sampled, and/or cropped) may be input to the same one or more pre-processing circuits 965a-n or permutations of different image frames of the burst may be input to different subsets of pre-processing circuits 965a-n, each subset including one or more pre-processing circuits 965a-n.

It should also be noted that one of the pre-processing circuits 965 may simply write the image frame (full, binned, sub-sampled, and/or cropped) to the image buffer 963 as an image data record 967 without performing substantive image processing (e.g., writing the intensity values received from the A/D converters 987 for the image frame to the image buffer 963).

Referring briefly to FIG. 11, image processing functions that may be performed by any of the image pre-processing circuits 965a-n and the image data records 967a-n derived from each image frame (whether full, binned, sub-sampled, windowed, and/or cropped) include: i) transfer of the image frame or a window within an image frame (full, binned, cropped, or sub-sampled) as a resulting image data record 967a-n to the image buffer 963; ii) cropping of an image frame (full, binned, cropped, or sub-sampled) and transfer of the resulting image data record 967a-n to the image buffer 963; iii) binning an image frame (full, binned, cropped, or sub-sampled) and transfer of the resulting image data record 967a-n to the image buffer 963; iv) sub-sampling an image frame (full, binned, cropped, or sub-sampled) and transfer of the resulting image data record 967a-n to the image buffer 963; v) generating a rotation of an image frame (full, binned, cropped, or sub-sampled) and transfer of the resulting image data record 967a-n to the image buffer 963; vi) generating a convolution of an image frame (full, binned, cropped, or sub-sampled) and transfer of the resulting image data record 967a-n to the image buffer 963; and vii) generating a double convolution which is a second sequential convolution performed on the result of a previously performed convolution of an image frame (full, binned, cropped, or sub-sampled) and transfer of the resulting image data record 967a-n to the image buffer 963. Each sequential convolution utilizes a different distinct kernel. Each of these image processing operations is described in more detail herein.

The pre-processing circuits 965a-n may be implemented in hardware gate logic 941 to provide for image processing very quickly such that processing by a pre-processing circuit 965a-n, and thereby generating and storing in the image buffer 963, one or more image data records 967a-n may be performed during the limited amount of time that the image frame is being read from the photo sensor array 102 such that raw pixel data (i.e., digital intensity values from the A/D converters coupled to the image sensor array) do not need to be stored in memory (other than simple FIFO buffers) prior to being processed by the pre-processing circuits 965a-n.

Control Circuitry

The control circuitry 939 may be any combination of hardware gate logic and/or a processor executing a code stored in a volatile or non-volatile memory. The control circuitry 939 interfaces with the image capture control and output system 107, the pre-processing circuits 965a-n, and the photo sensor array 102.

In operation the control circuitry 939 may receive, from the image capture control and output system 107 via a bus 200, image capture parameter values for a burst of one or more image frames (full, binned, sub-sampled, and/or cropped) to be sequentially captured. As will be described in more detail herein, the image capture parameter values define, for the burst of one or more image frames to be captured by the photo sensor, a quantity of image frames to be sequentially captured (the burst of images) and, for each image within the burst: i) whether a full image frame, binned image frame, sub-sampled image frame, or a window of a full, binned, or sub-sampled image frame is to be captured; ii) the binning or subsampling resolution (vertically and horizontally) and/or window cropping, if applicable; iii) an exposure setting; iv) a gain setting; and v) an indication of a permutation of one or more pre-processing functions to apply to the image frame (full, binned, sub-sampled and/or windowed), including pre-processing functions that are to be applied to an image data record resulting from a previous pre-processing function being applied to the image frame (full, binned, sub-sampled, and/or windowed).

In further operation, after receiving the image capture parameter values, the control circuitry 939 may, for each image frame to be captured, set image capture settings to the image capture parameter values for the image frame and, in response to a trigger signal from the image capture control and output system 107, drive the photo sensor array 102 to sequentially capture each of one or more image frames of the burst in accordance with the image capture settings and without further trigger signal(s) from the image capture control and output system 107.

In more detail, the control circuitry 939 adjusts the image capture settings between the exposure periods for each sequentially captured image frame such that each captured image frame within the burst of image frames is captured with image capture settings specifically defined for that image frame by the image capture control and output system 107. At least one of the multiple frames of image data may be captured with a distinct value of at least one image capture parameter.

Each captured image frame (full, binned, sub-sampled, and/or windowed) may, under control of the control circuitry 939 be input to selected one or more pre-processing circuits 965a-n in accordance with the image capture parameter values for purposes of performing the pre-processing functions previously described. The resulting image data records 967a-n are written to the image buffer 963.

Further, the control circuitry 939 may, for selected image data records 967a-n in the image buffer 963, drive selected other pre-processing circuits 965a-n to receive the selected image data record 967*a-n* and generate and write to the image buffer 963 an image data record 967*a-n* which is derived therefrom.

Further yet, the control circuitry 939 may, as requested by the image capture control and output system 107, provide certain image data records 967*a-n* (or portions of certain image data records 967*a-n*) to the image capture control and output system 107 for further processing and decoding.

Image Capture and Decode Module

In one embodiment, the image capture module 962 of the image capture control and output system 107, when executed by the processor 948 in conjunction with the hardware circuits 950, controls image capture by: i) defining (or receiving from the decoder 25) image capture parameter values for a burst of one or more image frames to be sequentially captured by the photo sensor array 102 of the image sensor system 111 and the image processing to be performed on each image frame; ii) initiating the capture of the sequence of one or more image frames by the photo sensor array 102 and the corresponding performance of the image processing thereon by the pre-processing circuits 965*a-n* to generate image data records 967*a-n*, each of which is a derivative of an image frame within the sequence of one or more image frames; and iii) controlling the illumination sub-systems 930*a-c* to illuminate the barcode within the field of view during capture of each frame of the sequence of one or more image frames. The image capture module 962 may further define, or receive from the decoder an indication of, which of the image data records or portions of the image data records are to be provided to the decoder 25 for decoding of the barcode.

As described, the image capture parameter values may define a quantity of image frames to be sequentially captured (the burst of images) and, for each image within the burst: i) whether a full image frame, binned image frame, sub-sampled image frame, or a window of a full, binned, or subsampled image frame is to be captured; ii) the binning or subsampling resolution (vertically and horizontally) and/or the windowing cropping for the image frame to be captured if applicable; iii) an exposure setting; iv) a gain setting; and v) an indication of a permutation of one or more previously described pre-processing functions to apply to the image frame (full, binned, sub-sampled, and/or cropped) by the image pre-processing circuits 965*a-n* within hardware gate logic 941 of the image sensor system 111, including pre-processing functions that are to be applied to image data records 967*a-n* resulting from a previous pre-processing function being applied to the image frame (full, binned, sub-sampled and/or cropped).

The exposure period may be the duration of time each pixel is exposed (i.e., the duration of time between the beginning of the exposure period and the end of the exposure period).

The gain setting may be a gain value implemented for ensuring that the pixel intensity values (or binned pixel intensity values) utilize the dynamic range of the A/D converters.

Initiating the capture of the sequence of one or more image frames of a barcode within a field of view of the photo sensor array 102 may include providing a single trigger signal to the control circuitry 939 of the image sensor system 111 to initiate the capture of the sequence of one or more image frames. Such a single trigger signal may be provided after the image capture parameter values defining the sequence of image frames to be captured and pre-processing to be performed by pre-processing circuits 965*a-n* within the image sensor system 111 have been provided to the control circuitry 939 such that the control circuitry 939 may autonomously capture the sequence of image frames and drive the pre-processing circuits 965*a-n* to perform the applicable pre-processing in accordance with the image capture parameter values without further control having to be provided by the image capture control and output system 107.

Controlling the illumination sub-systems 930*a-c* to illuminate the barcode within the field of view during capture of each frame of the sequence of one or more image frames may comprise controlling illumination logic 954 within hardware circuits 950.

In more detail, the illumination sub-systems 930*a-c* are coupled to the hardware circuits 950 which provide power required for the light-emitting diodes (LEDs) or other illumination sources to generate illumination under control of the illumination logic 954. More specifically, for each image frame to be captured by the photo sensor array 102, the image capture module 962 provides illumination parameters to the illumination logic 954 which control the illumination settings to be used for capture of the image frame. More specifically, the illumination parameters may define such illumination settings as: i) identifying which of at least one of the illumination sub-systems 930*a-c* are to be activated for the exposure period in which the image frame is captured; and ii) the intensity of illumination to be generated by each of the illumination sub-systems 930*a-c* that are to be activated. In certain exemplary embodiments the intensity may be defined as: i) a percentage from zero percent (0%) to one hundred percent (100%) representing the percent of a maximum illumination intensity that can be generated by the LEDs (or other illumination sources) of illumination sub-system; ii) pulse-width-modulation (PWM) parameters representing the percentage of time during the exposure period that maximum operating power is applied to the LEDs (or other illumination sources) of the illumination sub-system in a pulsing pattern; and iii) a percentage greater than one hundred percent (100%) representing a power level to be applied if the LEDs of the illumination sub-system are to be over-driven.

In certain embodiments, the illumination parameters may be provided to the illumination logic 954 for one or more image frames within a burst of image frames to be captured by the photo sensor array 102 by the image capture module 962 writing the illumination parameters for each frame to a distinct register within the illumination logic 954.

During capture of each image frame of one or more image frames within a burst of image frames, the illumination logic 954 sets the illumination settings for the image frame to conform to the illumination parameters for the image frame by configuring power circuits of the hardware circuits 950 to apply the applicable power to the applicable illumination sub-systems.

In one embodiment, the illumination logic is coupled to a flash signal 206 generated by the control circuitry 939 of the image sensor system 111. The flash signal 206 is configured to generate a signal indicating a start of each exposure period and an end of each exposure period for each image frame captured by the photo sensor array 102 within a burst of one or more image frames. In this embodiment the illumination logic 954 may, for each image frame: i) set the illumination settings for the image frame to conform to the illumination parameters for the image frame by configuring power circuits of the hardware circuits 950 to apply the applicable power to the applicable illumination sub-systems 930*a-c*; ii) apply the applicable power to the applicable illumination sub-system 930*a-c* when the flash signal 206 indicates the start of the exposure period for the image frame; iii) deactivate the power to the illumination sub-systems 930*a-c* when the flash signal 206 indicates the end of the exposure period; and iv) repeat steps i)-iii) for the next image frame within the sequence utilizing the illumination parameters for that next image frame within the sequence. The illumination parameters may be considered image capture parameter values in addition to those image capture parameter values previously described.

Decoder

The decoder 25, when executed by the processor 948, may: i) determine which of the one or more image data records 967*a-n* (or windows within one or more image data records 967*a-n*) may be transferred from the image buffer 963 to the image capture control and output system 107; ii) determine a permutation of one or more pre-processing functions (performed by pre-processing circuits 951*a-n*) to apply to each of the image data records 967*a-n* (or windows within one or more image data records 967*a-n*) to generate, and write to the buffer memory 970, image data records 953*a-n* (each of which is also a derivative of the one or more image frames (whether full, binned, or sub-sampled) captured by the photo sensor array 102; iii) determine a permutation of one or more pre-processing functions (performed by the image processing module 979 when such code is executed by the processor 948) to apply to each of the image data records 953*a-n* (or windows within one or more image data records 953*a-n*) to generate, and write to the buffer memory 970, additional (or replacement) image data records 953*a-n* (each of which is also a derivative of the one or more image frames (full, binned, sub-sampled, and/or cropped) captured by the photo sensor array 102; and iv) decode the barcode present within the field of view of the barcode reader and imaged within the one or more image frames (whether full, binned, or sub-sampled) captured by the photo sensor array 102 and represented by at least a portion of one of the image data records 953*a-n* derived from such an image frame.

Figure 8:
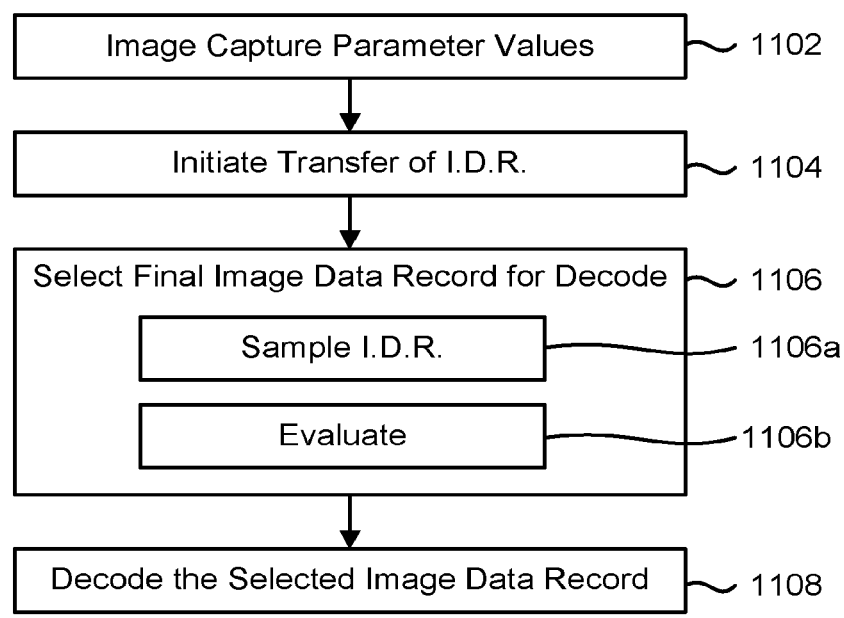
FIG. 8 illustrates an example of a method for decoding an image data record in accordance with one embodiment.

Referring to FIG. 8, exemplary operation of the decoder 25 is depicted in accordance with one embodiment. Step 1102 represents the decoder 25 and/or the image capture module 962 determining the image capture parameter values for a burst of one or more image frames as previously described.

Step 1104 represents transferring one or more image data records 967*a-n* (or portions of one or more image data records 967*a-n*) from the image buffer 963 to the image capture control and output system 107 and establishing which, if any, pre-processing functions are to be performed by image pre-processing circuits 951*a-n* and/or the image processing module 979.

Step 1106 represents selecting an image data record 953 for decoding, which may include sampling final image data records 953*a-n* at step 1106*a* and evaluating the sample image data records 953*a-n* at step 1106*b*.

Step 1108 represents decoding the selected image data record 953. This operation may include, based on the resulting image data records 953*a-n* meeting or failing to meet certain criteria: i) driving image pre-processing circuits 951*a-n* or the processing module 979 to perform additional image processing operations, as previously described, on one or more of the image data records 953*a-n* within the buffer memory 970 (or on a window of, a binning of, or a sub-sampling of each of one or more image data records 953*a-n*) and write resulting additional, or replacement, image data records 953*a-n* to the buffer memory 970; ii) driving the transfer of one or more additional image data records 967*a-n* (full, windowed, binned, or sub-sampled) to the image capture control and output system 107 (without obtaining an additional burst of one or more image frames) and, optionally driving performance of additional pre-processing operations on the additional image data records 967*a-n* by the pre-processing circuits 951*a-n* or the image processing module 979; and/or iii) driving capture of one or more additional bursts of image frames (whether full, windowed, binned or sub-sampled), resulting in one or more additional image data records 967*a-n* being written to the image buffer 963, and then driving transfer of one or more of the additional image data records 967*a-n* (full, windowed, binned or sub-sampled), but not necessarily all of the additional image data records 967*a-n* in the image buffer 963, to the image capture control and output system 107 and, optionally driving performance of additional pre-processing operations on the additional image data records 967*a-n* by the pre-processing circuits 951*a-n* or the image processing module 979. This aspect of the operation may be repeated until at least one of the image data records 953*a-n* is decodable by the processor 948 operating the decoder 25.

Pre-Processing Circuits 951

The pre-processing circuits 951*a-n*, similar to pre-processing circuits 965*a-n*, may be implemented within hardware circuits 950. The pre-processing circuits 951*a-n* may perform operations such as convolution, binning, sub-sampling, and other image processing functions on image data records 967*a-n* (each of which is provided by the image sensor system 111 via the bus 200 and each of which is, or is a derivative of, an image frame (full, binned, sub-sampled, and/or cropped) captured by the photo sensor array 102) to generate, and write to the buffer memory 970, one or more image data records 953*a-n*.

Each pre-processing circuit 951*a-n* may receive as input either: i) an image data record 967*a-n* (or a window of, a binning of, or a sub-sampling of, an image data record 967*a-n*) directly from the image sensor system 111 by way of the wide bus 200; or ii) an image data record 953*a-n* from the buffer memory 970 which is the result of a different pre-processing circuit 951*a-n* previously operating on an image data record 967*a-n* (or a window of, a binning of, or a sub-sampling of, an image data record 967*a-n*) received from the image sensor system 111 by way of the wide bus 200.

It should be noted that one image data record 967*a-n* (or a window of, a binning of, or a sub-sampling of, an image data record 967*a-n*) may be input to multiple pre-processing circuits 951*a-n*, resulting in multiple image data records 953*a-n* being written to the buffer memory 970 for the same image data record 967*a-n* (or a window of, a binning of, or a sub-sampling of, an image data record 967*a-n*).

Further, for a burst of multiple image frames the image data record 967*a-n* (or a window of, a binning of, or a sub-sampling of, an image data record 967*a-n*) received and processed by the pre-processing circuits 951*a-n* may represent different image frames within the burst captured by the photo sensor array 102. The image data records 967*a-n* (or a window of, a binning of, or a sub-sampling of, an image data record 967*a-n*) received and processed by the pre-processing circuits 951*a-n* may be the result of applying the same pre-processing functions by pre-processing circuits 965*a-n* to each of the multiple image frames within the burst.

Each image data record 967*a-n* (or a window of, a binning of, or a sub-sampling of, an image data record 967*a-n*) received may be input to the same one or more pre-processing circuits 951*a-n* or may be input to different subsets of pre-processing circuits 951a-n, each subset including one or more pre-processing circuits 951a-n.

It should also be noted that one of the pre-processing circuits 951a-n may simply write the image data record 967a-n (which may be an image frame captured by the photo sensor array 102 (full, binned, sub-sampled, and/or cropped) without previous processing by pre-processing circuits 965a-n) to the buffer memory 970 without performing substantive image processing.

Referring again to FIG. 11, operations performed by, and derivatives of the frame of image data produced by, the pre-processing circuits 951a-n may include: i) transfer of the image data record 967a-n (or a window, binning, or sub-sampling of the image data record 967a-n) to the buffer memory 970 as an image data record 953a-n without substantive processing; ii) binning of an image data record 967a-n (or a window or sub-sampling of the image data record 967a-n) and writing the result to the buffer memory 970 as an image data record 953a-n; iii) subsampling of an image data record 967a-n (or a window, binning, or sub-sampling of the image data record 967a-n) and writing the result to the buffer memory 970 as an image data record 953a-n; iv) generating a rotation of an image data record 967a-n (or a window of, a binning of, or sub-sampling of the image data record 967a-n) and writing the result to the buffer memory 970 as an image data record 953a-n; v) generating a convolution of an image data record 967a-n (or a window or sub-sampling of the image data record 967a-n) and writing the result to the buffer memory 970 as an image data record 953a-n; and vi) generating a double convolution, which is a second sequential convolution performed on the result of a previously performed convolution, of an image data record 967a-n (or a window or sub-sampling of the image data record 967a-n) and writing the result to the buffer memory 970 as an image data record 953a-n. Each sequential convolution utilizes a different, distinct kernel.

The pre-processing circuits 951a-n may be implemented in hardware circuits 950 to provide for image processing very quickly such that processing by a pre-processing circuit 951a-n, and thereby generating, and storing in the buffer memory 970, one or more image data records 953a-n may be performed during the limited amount of time that the image data records 967a-n are being transferred to the image capture control and output system 107 via the bus 200 without requiring storage of the transferred image data records 967a-n in memory prior to pre-processing by pre-processing circuits 951a-n.

Image Processing Module

The image processing module 979, when executed by the processor 948, may perform similar pre-processing functions as performed by the pre-processing circuits 965a-n and pre-processing circuits 951a-n.

In more detail, the image processing module 979 may perform operations such as convolution, binning, sub-sampling, and other image processing functions on image data records 953a-n (each of which has been previously written to the buffer memory 970 and each of which is, or is a derivative of, an image frame (full, binned, sub-sampled, and/or cropped) captured by the photo sensor array 102) to generate, and write to the buffer memory 970, one or more additional, or replacement, image data record 953a-n.

The image processing module 979 may receive as input an image data record 953a-n (or a window of, a binning of, or a sub-sampling of, an image data record 953a-n) from the buffer memory 970.

It should be noted that one image data record 953a-n (or a window of, a binning of, or a sub-sampling of, an image data record 953a-n) may be input to multiple pre-processing functions of the image processing module 979 resulting in multiple additional, or replacement, image data records 953a-n being written to the buffer memory 970 for the same image data record 953a-n (or a window of, a binning of, or a sub-sampling of, an image data record 953a-n).

Further, for a burst of multiple image frames, the image data record 953a-n (or a window of, a binning of, or a sub-sampling of, an image data record 953a-n) received and processed by the image processing module 979 may represent different image frames within the burst captured by the photo sensor array 102. The image data records 953a-n (or a window of, a binning of, or a sub-sampling of, an image data record 943a-n) received and processed by the image processing module 979 may be the result of applying the same pre-processing functions to each of the multiple image frames within the burst.

Each image data record 953a-n (or a window of, a binning of, or a sub-sampling of, an image data record 953a-n) may be input to the same one or more pre-processing functions of the image processing module 979 or may be input to different subsets of pre-processing functions of the image processing module 979, each subset including one or more pre-processing functions.

Referring again to FIG. 11, operations performed by, and derivatives of the frame of image data produced by, the image processing module 979 may include: i) binning of an image data record 953a-n (or a window or sub-sampling of the image data record 953a-n) and writing the result to the buffer memory 970 as an additional, or replacement, image data record 953a-n; ii) subsampling of an image data record 951a-n (or a window, binning, or sub-sampling of the image data record 951a-n) and writing the result to the buffer memory 970 as an additional, or replacement, image data record 953a-n; iii) generating a rotation of an image data record 953a-n (or a window of, a binning of, or sub-sampling of the image data record 953a-n) and writing the result to the buffer memory 970 as an additional, or replacement, image data record 953a-n; iv) generating a convolution of an image data record 953a-n (or a window or sub-sampling of the image data record 953a-n) and writing the result to the buffer memory 970 as an additional, or replacement, image data record 953a-n; and v) generating a double convolution, which is a second sequential convolution performed on the result of a previously performed convolution, of an image data record 953a-n (or a window or sub-sampling of the image data record 953a-n) and writing the result to the buffer memory 970 as an additional, or replacement, image data record 953a-n. Again, each sequential convolution utilizes a different, distinct kernel.

Further, as previously discussed, the decoder 25 may additionally, prior to the capture of the burst of one or more image frames by the photo sensor array 102, based on analysis of image data records 953a-n derived from one or more previous bursts of one or more image frames (full, binned, sub-sampled, and/or cropped) define any permutation of, or all of, the image capture parameter values previously discussed for the burst (or next burst) of one or more image frames.

Again, such image capture parameter values define: a quantity of image frames to be sequentially captured (the burst of images) and, for each image within the burst: i) whether a full image frame, binned image frame, or sub-sampled image frame is to be captured; ii) the binning or subsampling resolution (vertically and horizontally) for the image frame to be captured if applicable; iii) an exposure setting; iv) a gain setting; and v) an indication of a permutation of one or more pre-processing functions to apply to the image frame (full, binned, or sub-sampled), including pre-processing functions that are to be applied to an image data record resulting from a previous pre-processing function being applied to the image frame (whether full, binned, or sub-sampled).

The image capture parameter values may be provided directly by the decoder 25 to the control circuitry 939 of the image sensor system 111 via the bus 200 or may be provided to the image capture module 962 which in turn provides the image capture parameter values to the control circuitry 939 of the image sensor system 111 via the bus 200.

Interface 200

As discussed, the image sensor system 111 and the image capture control and output system 107 may be included in two separate packages or may be two separate dies within the same package, in each case, communicating over the interface 200.

Figure 6:
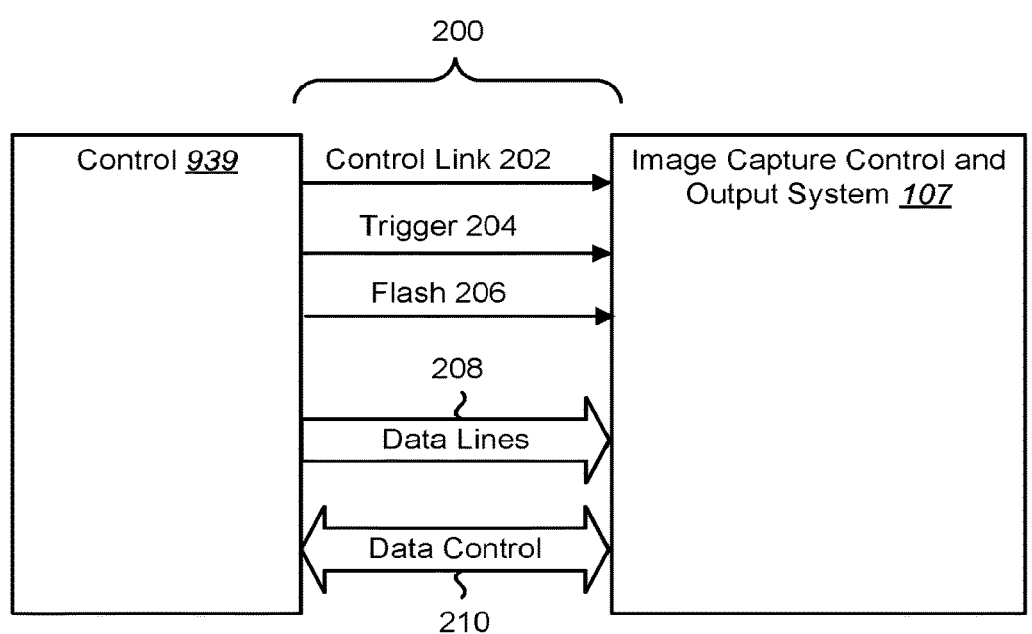
FIG. 6 shows an example of an interface between the control circuitry in the image sensor system and the image capture control and decode system.

FIG. 6 shows the interface 200 between the image sensor system 111 and the image capture control and output system 107. The interface 200 may comprise a control link 202 that may be a two-way serial control channel enabling the image capture control and output system 107 to: i) set parameters (e.g., the quantity of images to be captured in a burst, exposure period for each frame, gain setting for each frame, resolution setting for each frame, or the like); ii) select which image pre-processing circuits 965*a-n* are to be applied to each captured frame, thereby determining the characteristics of the image data records 967*a-n* written to the image buffer 963; and iii) select image data records 967 for transfer to the image capture control and output system 107.

The interface 200 may further include a trigger signal line 204 controlled by the image capture control and output system 107 to initiate autonomous capture of a burst of one or more image frames and subsequent image pre-processing and writing of image data records 967*a-n* to the image buffer 963.

The interface 200 may further include a flash signal 206 which is output by the image sensor system 111 to signal the start of each exposure period and the end of each exposure period. The image capture control and output system 107 may control the illumination system 103 based on the flash signal 206. More particularly, the image capture control and output system 107 may activate the selected illumination sub-system(s) 930*a-n* at the selected intensities during the exposure of each applicable frame based on the flash signal 206 indicating the start of the exposure period. The illumination system 103 may be configured to deactivate the exposure illumination when the flash signal 206 indicates the end of the exposure period and activate the targeting illumination during the time period between exposure periods of sequential frames.

The interface 200 may further include data lines 208 that may be parallel or serial and that provide for the transfer of image data records 967 from the image sensor system 111 to the image capture control and output system 107.

The interface 200 may further include data control signals 210 which may be signals to indicate the time each pixel value is valid on a data line, and indicate location of the pixel within the image array represented by the image data records (e.g., horizontal blanking, vertical blanking).

It should be appreciated that the barcode image is captured, processed, and stored in the first package (i.e., the image sensor system 111) at a much faster speed and may then be transferred to the second package (the image capture control and output system 107) for decoding at a slower speed. The image buffer 963 may be large enough to hold an entire frame of image data (in combination with image data records 967*a-n* derived from the frame of image data), and the entire frame of image data and/or combinations of one or more image data records 967*a-n* may be read out of the image buffer 963 after the entire frame of image data is put into the image buffer 963.

In one embodiment, instead of transferring all frames of image data captured in a burst, a subset of the multiple frames of image data generated in a burst may be transferred to the image capture control and output system 107 at a speed commensurate with transfer by a bus 200 at a second or slower speed.

Operation

Figure 7:
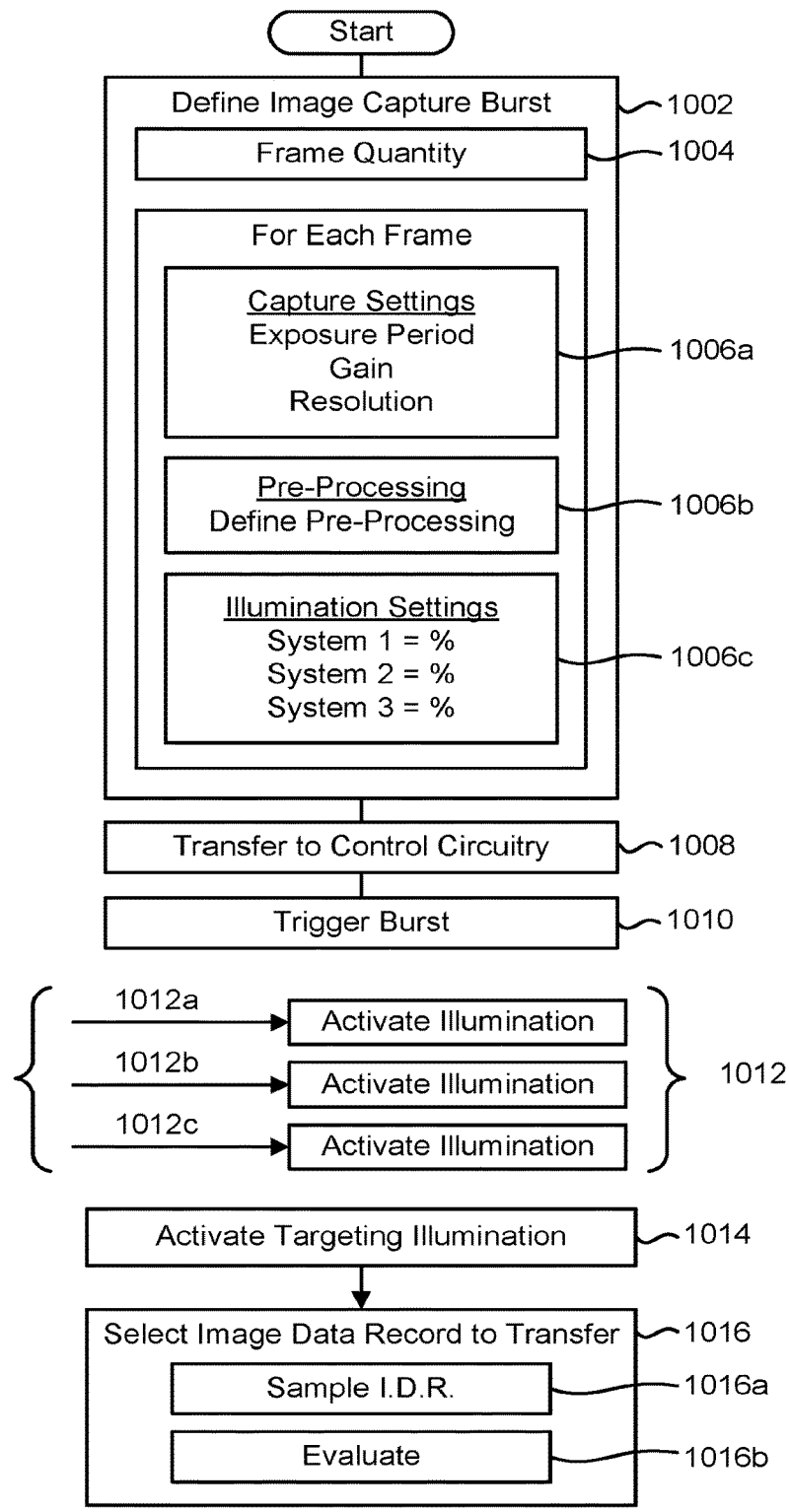
FIG. 7 illustrates an example of a method for selecting an image data record in accordance with one embodiment.

Referring to FIG. 7 in conjunction with FIGS. 3, 4, and 5, an exemplary operation of certain components are represented in accordance with an embodiment of the present invention.

Step 1002 represents defining image capture parameter values for a burst of image frames to capture. In more detail, defining the image capture parameter values may comprise the image capture module 962 or the decoder 25 defining the quantity of image frames to capture (full, binned, sub-sampled, and/or windowed) in sequence at sub-step 1004 and for each frame in the sequence, defining: i) image capture parameter values for the image frame such as the exposure period, gain settings, and/or resolution settings (if capturing a binned or sub-sampled image frame) at sub-step 1006*a*; ii) the image processing functions to which the image frame will be subject by pre-processing circuits 965*a-n* for purposes of defining the image data records 967*a-n* to be written to the image buffer 963 at sub-step 1006*b*; and/or iii) the illumination settings for the image frame at sub-step 1006*c*.

The illumination settings may be defined as a combination of: i) identifying which illumination sub-systems 930*a-c* are to be used for capturing the image frame and ii) for each illumination sub-system 930*a-c*, the percentage of full intensity at which the illumination is to be activated.

More specifically, the status of each illumination sub-system 930*a*, 930*b*, 930*c* (i.e., active or non-active and, if active, the intensity level) may be different for each image frame captured. For example, when two sequential frames are captured, the first frame may be captured with only illumination sub-system 930*a* active while the second frame may be captured with only illumination sub-system 930*b* active.

Further, the selection of image capture parameter values, including the non-active and active illumination sub-systems 930*a*, 930*b*, 930*c* for capturing images, may be based on characteristics of the image data records 967*a-n* in the image buffer 963 or image data records 953*a-n* in the buffer memory 970 from previously captured image frames.

Step 1008 represents: i) transferring the image capture parameter values for the image capture burst to the control circuitry 939 of the image sensor system 111 utilizing the bi-directional control link 202 of the interface 200; and ii) configuring the illumination logic to drive the applicable illumination sub-system 930*a-c* in accordance with the illumination parameters during an exposure time for capture of each image frame. It should be appreciated that image capture parameter values transferred to the control circuitry 939 do not need to include parameter values related to illumination when illumination is controlled by illumination logic 954 within the image capture system package 107. However, in an embodiment wherein the illumination logic 954 controlling illumination sub-systems 930*a-n* is within the image sensor system 111 (not shown on FIG. 3) then illumination parameter values would be transferred to the control circuitry 939.

Step 1010 represents driving the single trigger signal to the control circuitry 939 to initiate capture of the burst of one or more image frames, and subsequent image pre-processing and writing of image data records 967a-n to the image buffer 963 which, as discussed, may be without further control by the image capture system package 107.

Step 1012 represents the illumination logic 954 receiving from the control circuitry 939 of the image sensor system 111, for each image frame of the burst, a flash signal 1012a-c indicative of the exposure period commencement and termination for the image frame and activating the illumination system 103 in accordance with the illumination settings applicable to that image frame as defined at step 1006c.

Step 1014 represents activating targeting illumination after capturing the burst of image frames for purposes of projecting a targeting pattern of illumination into the field of view to assist the operator of the barcode reader in maintaining the desired barcode within the field of view of the barcode reader in case an additional burst of one or more image frames is required. After the barcode within the field of view has been decoded the targeting illumination may be deactivated.

Step 1016 represents selecting which image data records 967a-n (or selected portions or windows within each image data record 967a-n) are to be transferred from the image buffer 963 to the image capture control and output system 107. More specifically, the decoder 25 or the image capture module 962 may obtain portions (e.g., samples) of one or more image data records 967a-n at sub-step 1016a and evaluate each for the quality of the image of the barcode within the image data record at sub-step 1016b to select one or more image data records 967a-n, but fewer than all image data records 967a-n, to transfer from the image buffer 963 to the image capture control and output system 107 for decoding.

The image data records 967a-n being transferred may have the best quality image of the barcode or other characteristics of the image of the barcode which are likely to result in a decodable barcode image. For example, the quality of an image of a barcode may be measured in terms of the contrast between light cells and dark cells within the barcode. A barcode image having relatively high contrast between dark cells and light cells may be considered to have higher quality than a barcode image having relatively low contrast between dark cells and light cells.

The superior contrast profile may mean at least one of: (i) greater maximum amplitude between the portions of the image within the subset that are dark marks of the barcode and the portions of the image within the subset that are light marks of the barcode; and (ii) more distinct transitions between portions of the image within the subset that are dark marks of the barcode and the portions of the image within the subset that are light marks of the barcode.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of intensity such that the exposure of the image yields both dark cells and light cells that are within the dynamic range of the photo sensor array 102. This yields better contrast than any of the following: (i) a dimly lit barcode; (ii) a brightly lit barcode wherein the image is washed out beyond the dynamic range of the photo sensor array 102; (iii) an unevenly lit barcode with bright washed-out spots; or (iv) a barcode illuminated with illumination that is not compatible with the reflectivity characteristic(s) of the cells of the barcode. An example of (iv) is illumination directed from the sides of the field of view that yields a higher contrast image of a barcode formed by etching technology than does illumination parallel to the optical axis.

If the quality of a window of images is measured in terms of contrast, determining the selected illumination system configuration may include determining which window image of the plurality of window images has the highest contrast between light and dark cells of the barcode, and determining which configuration of the plurality of illumination sub-systems 930a-c was activated when the window image having the highest contrast was captured.

In one embodiment, each of the image data records 967a-n which are transferred to the image capture control and output system 107 may be written to the buffer memory 970 as image data records 953a-n without further image processing. In another embodiment, the image pre-processing circuits 951a-n may perform image processing and writing of resulting image data records 953a-n to the buffer memory 970 as previously discussed.

Also, as previously discussed, one of the pre-processing circuits 965a-n may simply write input data as an image data record 967a-n to the image buffer 963 without additional substantive processing.

As such, the structure depicted in FIG. 3 and FIG. 4 enables an image frame, as captured by the photo sensor array 102, to be written as an image data record 967 to the image buffer 963 without substantive processing, then subsequently transferred to the image capture control and output system 107 where it either: i) undergoes image pre-processing by one or more pre-processing circuits 951a-n, resulting in one or more image data records 953a-n being written to the buffer memory 970 as a result of such pre-processing; or ii) is written to the buffer memory 970 as an image data record 953a-n without pre-processing by either the pre-processing circuits 965a-n or the pre-processing circuits 951a-n.

The structure depicted in FIG. 3 and FIG. 4 also enables an image frame, as captured by the photo sensor array 102, to undergo image pre-processing utilizing one or more pre-processing circuits 965a-n and to be written to the image buffer 963 as one or more image data records 967a-n and then have one or more of the image data records 967a-n transferred to the image capture control and output system 107 where the transferred image data records 967a-n are: i) written to the buffer memory 970 as image data records 953a-n without further pre-processing; or ii) subjected to further pre-processing by image pre-processing circuits 951*a-n*, resulting in writing of image data records 953*a-n* to the buffer memory 970.

Further, as discussed, the processing module 979 may undertake processing of one or more image data records 953*a-n* to modify the image data records and/or generate additional, or replacement, image data records from one or more image data records 953*a-n*. As such, any image data record 953*a-n* may be processed by the image processing module 979 prior to being subjected to decoding, whether it is: i) representative of the image frame captured by the photo sensor array 102 without substantive processing by either the pre-processing circuits 965*a-n* or the pre-processing circuits 951*a-n*; ii) pre-processed by one of the pre-processing circuits 965*a-n* but without further substantive pre-processing by one of the pre-processing circuits 951*a-n*; iii) not substantively processed by one of the pre-processing circuits 965*a-n* but substantively pre-processed by one of the pre-processing circuits 951*a-n*; or iv) substantively pre-processed by both one of the pre-processing circuits 965*a-n* and one of the pre-processing circuits 951*a-n*.

Preprocessing

Examples of pre-processing will be explained hereafter. The following examples of pre-processing may be: i) performed by the pre-processing circuits 965*a-n* on a frame of image data received from the photo sensor array 102 to generate image data records 967*a-n*, which are the image frame or a derivative of the image frame, to be written to the image buffer 963; and ii) performed by the pre-processing circuits 951*a-n* and/or the image processing module 979 (executed by the processor 948) on an image data record 967*a-n* transferred from the image buffer 963 to the image capture control and output system 107 for generating an image data record 953*a-n* which may be the original image frame or a derivative of the original image frame.

Preprocessing Example A

In one embodiment, no image processing may be performed such that the image data record may be the image frame (whether full, windowed, binned, or sub-sampled) without substantive processing.

Preprocessing Example B

In another embodiment, portions of the image frame may be cropped horizontally or vertically such that the image data record may be a windowed portion of the image frame (whether full, binned or sub-sampled).

Preprocessing Example C

In another embodiment, the image data record may be a lower resolution frame of the original image data. One of the pre-processing circuits may bin, or average, two or more pixel intensity values to generate a single intensity value representative of a theoretical pixel that encompasses the size of all of the pixels that provided values that were binned or averaged. Multiple image data records can be generated from the same frame of image data at different resolutions. Referring to FIG. 9A: i) 220 represents binning four pixels (e.g., averaging the four intensity values) to reduce the resolution to 25% of the resolution of the input image; ii) 222 represents vertical binning of two pixels to reduce vertical resolution by 50% without affecting horizontal resolution; and iii) 224 represents horizontal binning of two pixels to reduce horizontal resolution by 50% without affecting vertical resolution. It should be noted that FIG. 9A shows examples only and the binning may include any other grouping of pixels for resolution reduction.

Preprocessing Example D

In another embodiment, binarization may be performed. The binarization may involve comparing the intensity value of each pixel, or the intensity value resulting from the binning of a group of pixels, to a threshold. If it is greater than (or equal to) the threshold, the intensity value may be converted to a first binary value, and if it is less than (or equal to) the threshold, the intensity value may be converted to a second binary value. The threshold may be common across all pixels (or binned pixel groupings) or may be different for different pixels (or binned pixel groupings). The threshold value applied to any pixel (or binned pixel groupings) may be dynamic (e.g., the threshold value may be calculated based on the intensity values previously operated on during the binarization process).

Preprocessing Example E

In another embodiment, a minimum/maximum processing technique may be applied to any array of pixel intensity values or any array of binned or subsampled array of intensity values. It may be applied across the entire frame of image data (or an image data record) or to only a cropped section of the frame of image data (or an image data record). Referring to FIG. 9B, an exemplary 3×3 kernel 230 encompasses 9 pixel intensity values (or 9 binned intensity values). Of those 9 intensity values, the maximum intensity value or the minimum intensity value is determined and written to the image data record in substitution for the intensity value of the center value 234 for kernel 230. The kernel is then shifted to the next center value 236 (represented by kernel 232, which is shown shifted up slightly for clarity) and the maximum or minimum value among the nine intensity values is calculated for replacement of intensity value 236.

Preprocessing Example F

In another embodiment, convolution kernel masking may be performed. In this image processing technique, a kernel mask, such as the 3×3 kernel mask 240 as shown in FIG. 9C as an example, may be applied to a 3×3 group of pixel intensity values (or a 3×3 group of binned intensity values) to determine an intensity value to replace the center intensity value. More specifically, each intensity value is multiplied by the mask value (in the example of FIG. 9C, the center intensity value is multiplied by 8 and each surrounding intensity value is multiplied by −1) and then the resulting 9 values are averaged to determine the intensity value to replace the center intensity value. The kernel is then shifted by one pixel as described with respect to FIG. 9B to determine the intensity value for the next pixel.

Preprocessing Example G

Figure 9D:
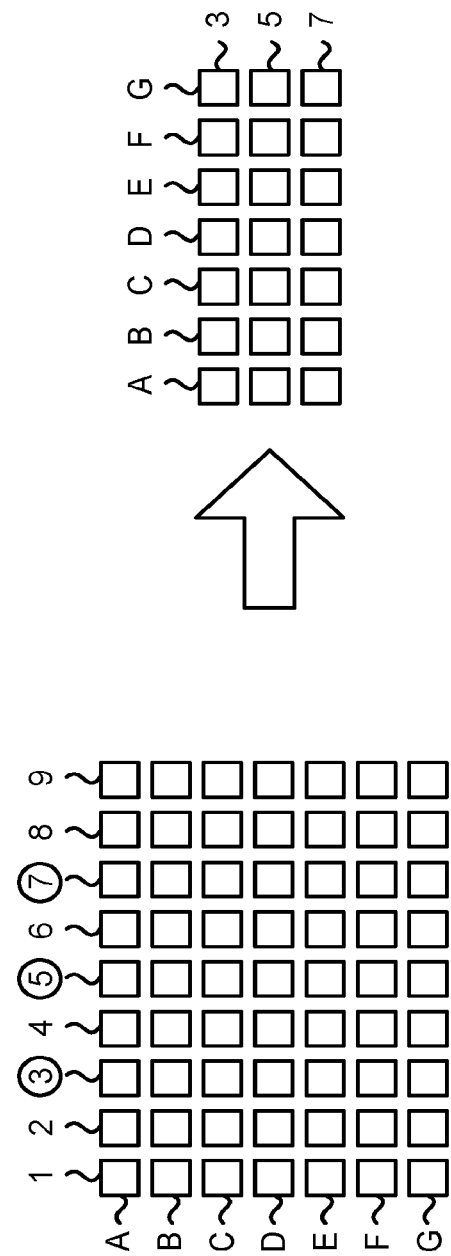

In another embodiment, a rotation may be performed as shown in FIG. 9D on an array of pixel values. More specifically, each intensity value for selected columns of the array (e.g., 3, 5, 7) may be extracted and used for intensity values of adjacent rows within an image data record. The selected columns may be adjacent columns or may be a fraction of the columns, evenly spaced, across all or a portion of the array. The array may be the image data (full, binned, sub-sampled, and/or windowed).

It should be appreciated that using one or more of the above processing techniques, image data records can be generated from the original image frame or image data records that have already been generated from the original image frame. Multiple processing techniques may be applied to the same frame of image data (or image data record) to result in different image data records derived therefrom, and the processing techniques may be applied in any order.

Sets of image data records may be generated from one or more image frames captured in a single sequence or in multiple sequences, and may be generated by a combination of the pre-processing circuits 965a-n of the image sensor system 111, pre-processing circuits 951a-n of the image capture control and output system 107, and/or the processor 148 of the image capture control and output system 107 executing the image processing module 979. For example, an image data record may be a frame of image data which may be an array of pixel intensity values, each pixel intensity value representing the intensity of illumination accumulating on the photo sensor pixel over the exposure period. Different image data records may each be a frame of image data captured using a different exposure period as shown in FIG. 10A, using a different gain setting, or using a different exposure illumination active during a different exposure period as shown in FIG. 10B. FIG. 10A shows, as an example, three image frames generated by using different exposure settings, respectively. FIG. 10B shows, as an example, four image frames that are generated using different illumination systems and different exposure settings. Only one of the illumination sub-systems 930a, 930b, 930c may be active during the exposure period for a first image data record while a different one of the illumination sub-systems 930a, 930b, 930c may be active during the exposure period for a second image data record.

Further, although not shown in FIG. 10B, multiple illumination systems may be active for an exposure period, at intensities that may be different. For example, during a first exposure period a first illumination sub-system 930a may be active at 10% power and a second illumination sub-system 930b may be active at 60% power and, during a second exposure period the first illumination sub-system may be active at 30% power while the second illumination sub-system may be active at 20% power.

Referring to FIG. 2A in conjunction with FIG. 1, in an exemplary embodiment, the operating system 48 may include an application retrieval system 49 which obtains the barcode-reading application 24 and the applications 50a, 50b from the application server 22a or 22b. In one embodiment, the operation of the application retrieval system 49, which may obtain the barcode-reading application 24 and the other applications 50a, 50b from the application server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application server 22a or 22b.

Figure 12A:
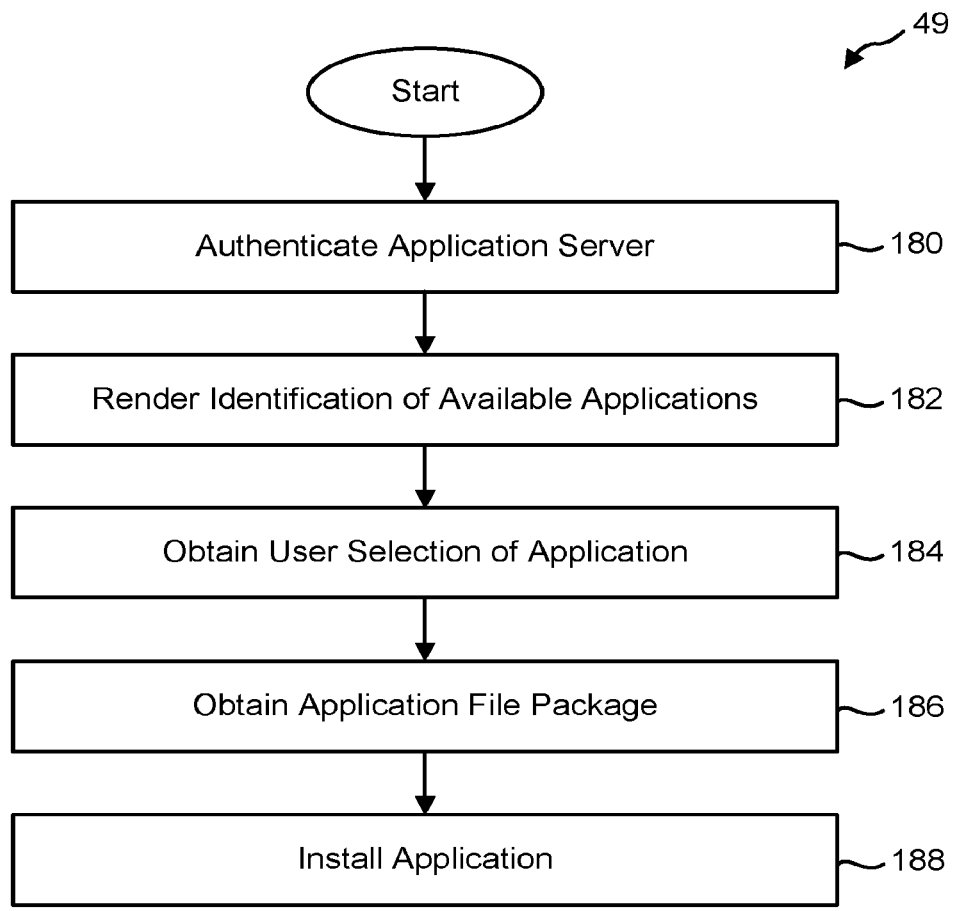
FIG. 12A is a flow diagram of an exemplary process for an operation of an application retrieval system.

FIG. 12A is a flow diagram of an exemplary process for the operation of the application retrieval system 49. Step 180 represents the application retrieval system 49 of the mobile device 18 establishing a secure connection to the application server 22a or 22b over the LAN 12, the wireless ISP network 17 and/or the Internet 16 and authenticating the application server 22a, 22b (i.e., mutual authentication between the mobile device and the application server). The mutual authentication may be established by using any conventional authentication protocol.

Step 182 represents rendering, on the display screen 66 of the mobile device 18, identification of applications which are available to the mobile device 18 for downloading. Step 184 represents obtaining user selection of an application to download.

Step 186 represents obtaining an application file package (e.g., an install package) from the application server 22a or 22b. The application file package may be temporarily stored in the memory 46 of the mobile device 18.

Step 188 represents installing the application. The installation process may include un-packing the install package and writing an executable application 50 to the memory 46.

Figure 12B:
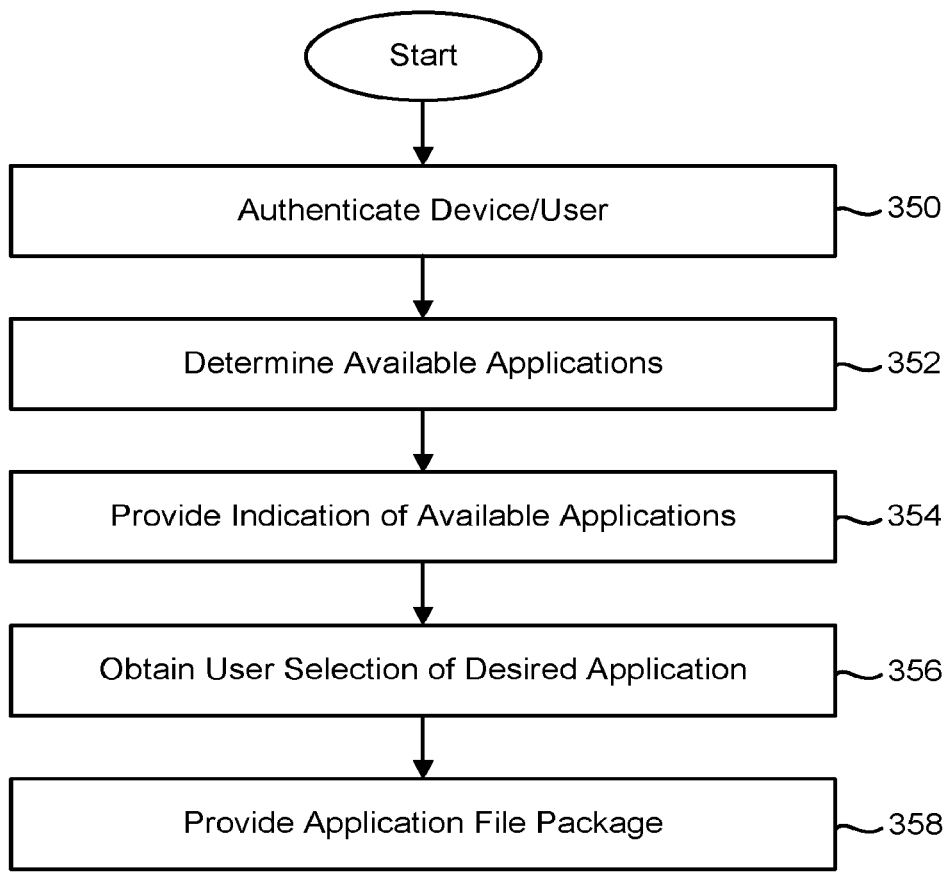
FIG. 12B is a flow diagram depicting an exemplary process for an operation of an application server.

FIG. 12B is a flow diagram depicting an exemplary process for operation of an application server 22a, 22b. Step 350 represents the application server 22a, 22b establishing a secure connection with the mobile device 18 over the LAN 12, the wireless ISP network 17, and/or the Internet 16 and authenticating the mobile device 18 and/or the user of the mobile device 18. Authenticating the user of the mobile device 18 may include: i) authenticating the individual to which the mobile device 18 is assigned or the individual using the mobile device 18, utilizing a combination of a user ID and a password or similar schemes for authenticating an individual, and/or ii) authenticating an organization, company, or other group of users to which the mobile device 18 is assigned, utilizing a combination of a user ID and a password or other similar schemes for identifying whether the mobile device 18 has been assigned to the organization, company, or group, and authenticating the assignment. The user ID may be unique to each mobile device 18 or common for all mobile devices 18 assigned to the organization, company, or group.

Step 352 represents the application server 22a, 22b determining a plurality of one or more applications (the barcode-reading application 24, applications 50a, 50b, etc.) available for download based on the individual, organization, company, or other group to which the mobile device 18 is assigned.

Figure 12C:
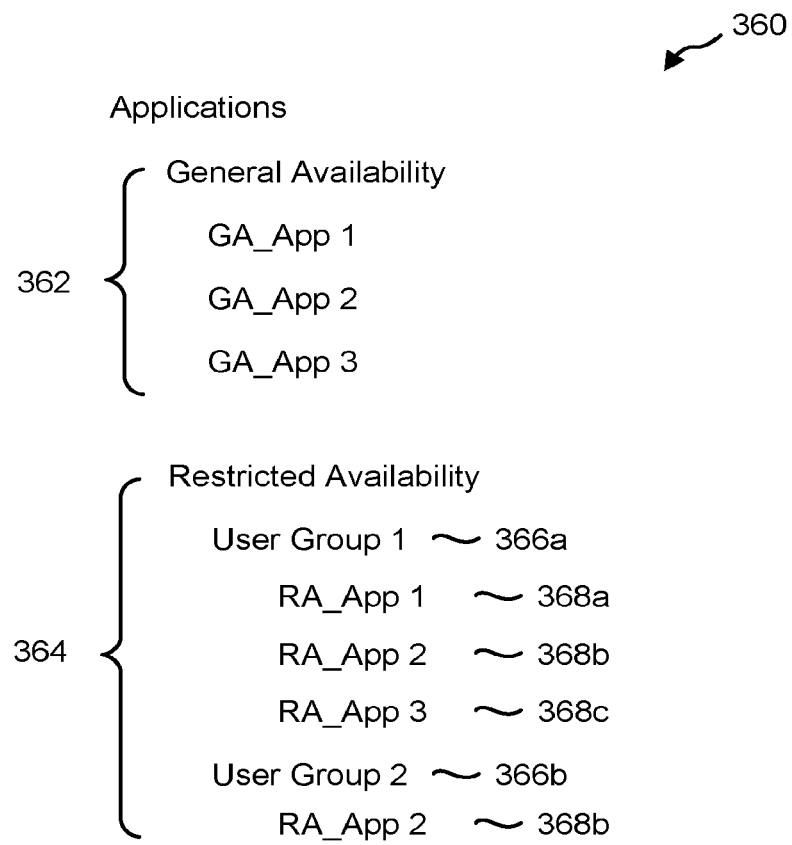
FIG. 12C shows an exemplary structure of a database of applications for downloading.

Turning briefly to FIG. 12C, the application server 22a, 22b may contain, or have access to, a database 360 which identifies generally available applications 362 which are available to any mobile device 18 without regard to the identification of the user, organization, company, or group to which the mobile device 18 is assigned; and restricted applications 364 which are available only to certain individuals, organizations, companies, and groups. For restricted applications 364, the database 360 may associate each user group 366a, 366b with identification of those restricted applications 368 available to that user group 366a, 366b. Each user group may be an individual, organization, company, or other group. For example, user group 1 366a may have access to restricted applications 368a, 368b, and 368c, and user group 2 366b may have access to restricted application 368b. In each case these restricted applications may be applications written custom for the user group (and therefore are not made available to other user groups) or may be licensed to the user group (and therefore are made available to those user groups which obtained a license for the applications).

Returning to FIG. 12B, step 354 represents the application server 22a, 22b providing an indication of the available applications to the mobile device 18. The available applications may include any of the generally available applications 362 and/or the restricted applications 364. The indication of the available applications may include, for each application, a display screen icon representing the application. The indication of available applications may not include all available applications but may include only those available applications within parameters established by the user, for example available applications which meet search criteria provided by the user. As such, step 354 may include making a search function available to the mobile device 18, obtaining search criteria or search terms from the user of the mobile device 18, and selecting matching applications that meet the search criteria from the applications available to the individual, organization, company, or group.

Step 356 represents the application server 22a, 22b obtaining a user selection of a desired application. The desired application may be one of the available applications indicated to the user at step 354.

Step 358 represents the application server 22a, 22b providing an application file package for the desired application to the mobile device 18. The application file package may be provided to the application retrieval system 49 of the mobile device 18 which is provided for writing the file package to a non-volatile memory and unpacking and loading the contents of the file package to generate instructions which, when loaded to a memory, may be executed by the processor 44.

Certain applications such as the barcode-reading application 24 may: i) require a license key from a license server 21a, 21b to enable operation of the application, ii) operate in a base mode of operation without a license key but require a license key from a license server 21a, 21b to enable at least one enhanced function to operate in an enhanced mode of operation, and/or iii) require a license key from a license server 21a, 21b to continue operating, or continue operating in the enhanced mode of operation, following the passage of time or following a threshold level of usage based on the time and/or the quantity of instances with which certain functions were performed (such as the quantity of decoding a barcode of a certain symbology or symbologies).

The at least one enhanced function may be a function of decoding a barcode symbology that the barcode-reading application 24 (e.g., the decoder 25) is restricted from decoding in the base mode of operation. Alternatively or additionally, the at least one enhanced function may be a function of decoding multiple barcodes in sequence at a rate that is faster than a rate at which the barcode-reading application 24 (e.g., the decoder 25) can decode multiple barcodes in sequence in the base mode of operation. Alternatively or additionally, the at least one enhanced function may be a function of decoding a quantity of barcodes of a particular symbology that exceeds a restricted threshold quantity of barcodes of the particular symbology that the barcode-reading application 24 (e.g., the decoder 25) can decode in the base mode of operation.

Alternatively or additionally, the at least one enhanced function may remove a demonstration restriction function (i.e., a demonstration factor that makes output of decoded data useful for demonstration purposes only) under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced function may enable at least one enhanced image processing function that improves an ability to decode an image of a barcode and is not operable when the decoder 25 operates in the base mode of operation. The enhanced image processing function may include preforming additional image processing algorithms which alter the image captured by the general-purpose camera assembly 36 prior to execution of the algorithms which attempt to decode a barcode depicted within the image.

In accordance with another embodiment, the base mode of operation may include a base decoding mode of operation and a demonstration mode of operation. In the base decoding mode of operation, the barcode-reading application 24 may drive the general-purpose camera assembly 36 to capture an image of a barcode and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology.

In the demonstration mode of operation, the barcode-reading application 24 may apply at least one enhanced barcode-reading function to decode the barcode, and perform at least one of: i) outputting an indication of successful decoding of the barcode, or ii) implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device 18.

The barcode-reading application 24 may perform an upgrade function in the demonstration mode of operation. The upgrade function may enable user selection to obtain the license code, obtain the license code based on the user selection, establish a network connection to the licensing server 21a, 21b, and obtain the license code from the licensing server 21a, 21b.

In order to obtain the license code from the licensing server 21a, 21b, the barcode-reading application 24 may communicate to the licensing server 21a, 21b one of: i) a unique identification code of the mobile device 18, or ii) a user identification code identifying a controller of the mobile device 18.

In accordance with another embodiment, the barcode-reading application 24 (e.g., a decoder 25 application) running on the processor 44 of the mobile device 18 may be configured to control the general-purpose camera assembly 36 of the mobile device 18 to capture an image of a barcode. The image of the barcode may be affected by at least one optic system of the general-purpose camera assembly 36. The decoder application may utilize a base decoder function for attempting to decode a barcode if an enhanced decoder mode has not been authorized for the mobile device 18, and utilize an enhanced decoder function for attempting to decode the barcode if the enhanced decoder mode has been authorized for the mobile device 18.

The enhanced decoder function may include a function of decoding a barcode symbology that the decoder application is restricted from decoding if the enhanced decoder mode has not been authorized for the mobile device 18. Alternatively or additionally, the enhanced decoder function may include a function of decoding multiple barcodes in sequence at a rate that is faster than a restricted rate at which the decoder application can decode a sequence of multiple barcodes if the enhanced decoder mode has not been authorized for the mobile device 18. Alternatively or additionally, the enhanced decoder function may include a function of decoding a quantity of barcodes of a particular symbology that exceeds a restricted quantity of barcodes of the particular symbology which the decoder application can decode if the enhanced decoder mode has not been authorized for the mobile device 18. Alternatively or additionally, the enhanced decoder function may remove a demonstration restriction function (i.e., a demonstration factor that makes output of decoded data useful for demonstration purposes) under which the decoder application functions when the enhanced decoder mode has not been authorized for the mobile device 18, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device 18, or iii) a function which restricts the decoded data or the scrambled decoded data from a barcode of at least one particular symbology from being displayed on a display screen of the mobile device 18. Alternatively or additionally, the enhanced decoder function may enable at least one enhanced image processing function which improves an ability to decode an image of a barcode and is not operable if the enhanced decoder mode has not been authorized for the mobile device 18. The enhanced decoder mode may be authorized by obtaining a license code from a licensing server 21*a*, 21*b*.

The decoder application may be configured to subject the license code to a predetermined algorithm to determine at least one operating permission authorized by the license code. The enhanced decoder function may correspond to the at least one operating permission authorized by the license code. The decoder application or any other application may be further configured to obtain the license code from the licensing server 21*a*, 21*b* by communicating to the licensing server one of: i) a unique identification code of the mobile device 18, or ii) a user identification code identifying a controller of the mobile device 18.

The barcode-reading application 24 (and the decoder application) disclosed above may be embodied on a computer-readable medium. The barcode-reading application 24 (and the decoder application) includes instructions executable by the processor 44 of the mobile device 18 for performing the functions disclosed above.

Figure 13:
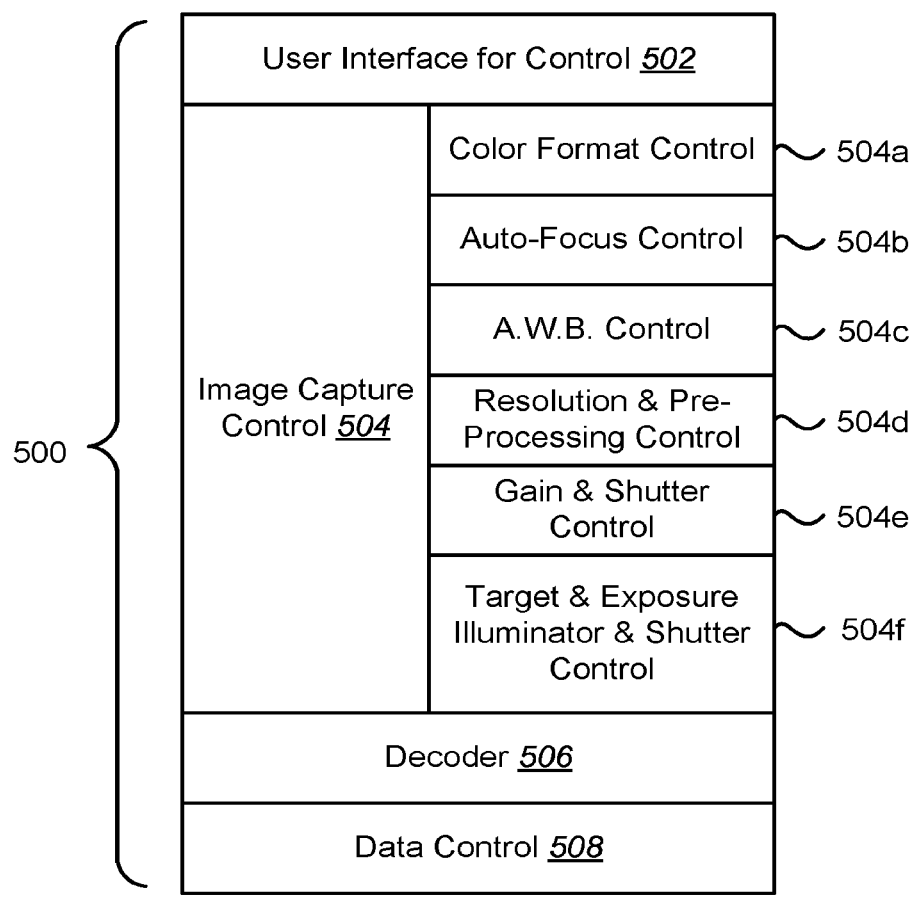
FIG. 13 illustrates exemplary methods useful for an application for a decoder system.

FIG. 13 shows a block diagram of an exemplary barcode application 500. The exemplary barcode application 500 may include permutations of a user interface control method 502, image capture control methods 504, a decoder 506, and a data control method 508.

The user interface control method 502 of the barcode application 500 may operate either in a user interface state or in a data collection state.

When in the user interface state, the (capacitive touch) display screen 66 and the backlight for the display screen are active and the contents of the display screen 66 may be controlled by the barcode application 500. When in the data collection state, the (capacitive touch) display screen 66 may be turned off; the (capacitive touch) display screen 66 may be turned on, but the backlight may be turned off; or both the (capacitive touch) display screen 66 and the backlight may be turned on, but the backlight intensity may be set to a minimum. The data collection state is intended for conserving power (i.e., for extending battery life) when the operator is using the mobile device 18 to read barcodes and does not need to simultaneously use the (captive touch) display screen 66 for manual data entry.

To transition from the user interface state to the data collection state, the barcode application 500 utilizing the data control method 508 may make a processing call to the operating system of the mobile device 18 requesting to i) turn off the display and backlight; ii) turn off the backlight (in the event the operating system does not make the function of turning off the display available to the application); or iii) turn the backlight power to a minimum (in the event the operating system does not make the function of turning off the display or turning off the backlight available to the application). If none of the foregoing options are available, the barcode application may simply write a black image to the display and enter a state where all input though the touch panel is ignored, thereby giving the appearance that the display has been turned off.

When in the data collection state, multiple barcodes can be read in sequence (utilizing the camera and targeting structure described herein but not requiring use of the display for targeting) and processed, stored, and/or transmitted by the application without requiring any user interaction with the user interface. Examples of the functions that may be performed by the application when in the data collection state without requiring user input include the functions of the relay application described in the U.S. patent application Ser. No. 14/319,193.

When a transition to the user interface state is required, the barcode application 500 may make a processing call to the operating system of the mobile device 18 requesting to i) turn on the display (i.e., the touch panel or backlight) in the event that these are turned off during the data collection state; ii) turn on the backlight (in the event the operating system does not make the function of turning off the display available to the application and therefore the display remains "on" while the backlight remains "off" during the data collection state); or iii) turn the backlight power up to a present level (in the event the operating system does not make the function of turning off the display or turning off the backlight available to the application, both remain "on" during the data collection state while the backlight power has been turned down).

Events that may trigger transition from the user interface state to the data collection state include user activation of a hardware control on the mobile device 18 or activation of a software control present on the display screen when in the user interface state. Events that may trigger transition from the data collection state to the user interface state include user activation of a hardware control on the mobile device 18 or a signal from a remote software application which may include the application to which the mobile device 18 is sending decoded barcode data.

Returning to FIG. 13, the image capture control method 504 may comprise permutations of color format control method 504*a*, autofocus control method 504*b*, auto-white balance control method 504*c*, resolution and pre-processing control method 504*d*, gain and shutter control method 504*e*, and target and exposure illumination and shutter control method 504*f*.

Permutations of these methods may be performed when the barcode application 500 enters the data collection state such that the mobile device 18 is configured for barcode reading prior to the operator triggering or otherwise initiating a barcode read. Permutation of these methods may be performed immediately following an unsuccessful decode with adjustments made to certain image capture settings based on analysis of the image that yielded the unsuccessful decode so that the mobile device 18 is re-configured for barcode reading prior to the next image capture. Permutations of these methods may be performed after the user has triggered or otherwise initiated a barcode read but prior to actual image capture to configure the mobile device 18 for the image capture.

The decoder 506 of the barcode application 500 may comprise known methods for image processing and decoding, including methods described in U.S. patent application Ser. No. 14/717,112. If decoding is unsuccessful, then a new barcode image may need to be captured. This may be done by returning to the image capture control method 504 and selecting new image capture parameters. This process may be repeated until the barcode image has been successfully decoded, or until the user cancels further image capture and/or decoding attempts.

In general, the data control method 508 of the barcode application 500 controls what processes are performed on data decoded from the barcode (decoded data) within the target area. In more detail, and with reference to FIG. 1, in a first aspect the data control methods 508 may function as a mobile client to a remote non-legacy system which supports maintaining a Transmission Control Protocol/Internet Protocol (TCP/IP) connection with mobile devices (such as mobile device 18) via the LAN 12 for exchanging data with the mobile device 18 (including receiving decoded data from the mobile device 18) and controlling operation of certain aspects of the barcode application 500.

In a second aspect, the data control methods 508 may function as a mobile client to an intermediary device. The intermediary device supports maintaining a TCP/IP connection with mobile devices (such as mobile device 18) via the LAN 12 for receiving decoded data from the mobile device 18. In turn the intermediary device may further support providing decoded data received from the mobile device 18 to a legacy system. This is useful when the legacy system is incapable of receiving decoded data directly from the mobile device 18 via a TCP/IP connection and therefore the barcode application 500 may function independently of, and requires no compatibility with, the communication protocols and functions of the legacy system, including those used for communication between the legacy system and the intermediary device. The intermediary device may communicate with the legacy system, which may be a TCP/IP connection separate from the TCP/IP connection through which the mobile device 18 communicates with the intermediary device.

Figure 14B:
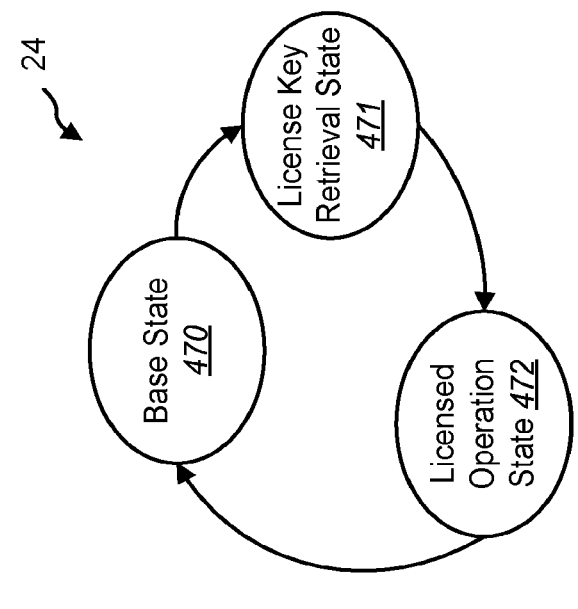
FIG. 14B is a state machine diagram depicting three states of operation in a barcode-reading application in accordance with another embodiment.
Figure 14A:
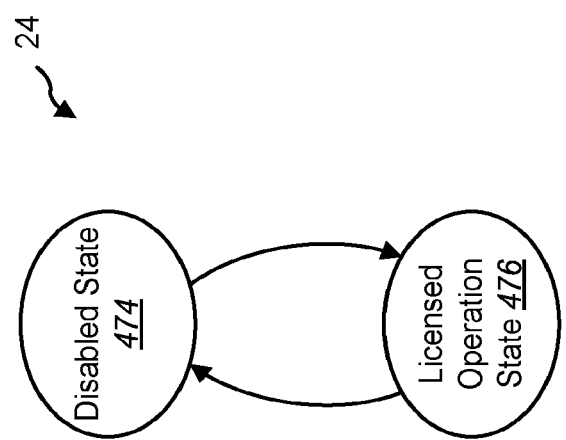
FIG. 14A is a state machine diagram depicting two states of operation in a barcode-reading application in accordance with one embodiment.

FIG. 14A is a state machine diagram depicting two states of operation in a barcode-reading application 24 in accordance with one embodiment. The first state of operation may be a disabled state 474 (which may also be referred to as a base state). In the disabled state 474, at least one function of the barcode-reading application 24 is disabled such that the barcode-reading application 24 may not output useful decoded data for further processing or transmission by the barcode-reading application 24 but may be capable of connecting to a licensing server 21*a*, 21*b* to obtain a license to transition the barcode-reading application 24 to a licensed operation state 476 (which may also be referred to as an enhanced operation state). The at least one function that may be disabled includes: i) an image capture function which, if enabled, would enable capturing an image of a barcode for image processing and decoding, ii) a decoding function which, if an image of a barcode is captured, would decode the image of the barcode to generate decoded data, iii) a data processing function which, if decoded data is generated, would process the decoded data as part of a useful workflow, and/or iv) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

The licensed operation state 476 may enable the function (s) that is/are disabled when the barcode-reading application 24 is in the disabled state 474 such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16).

There may be two sub-embodiments of the licensed operation state 476. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 from the disabled state 474 to the licensed operation state 476. The restrictions may be symbology restrictions, time restrictions, and/or quantity restrictions.

Figure 15:
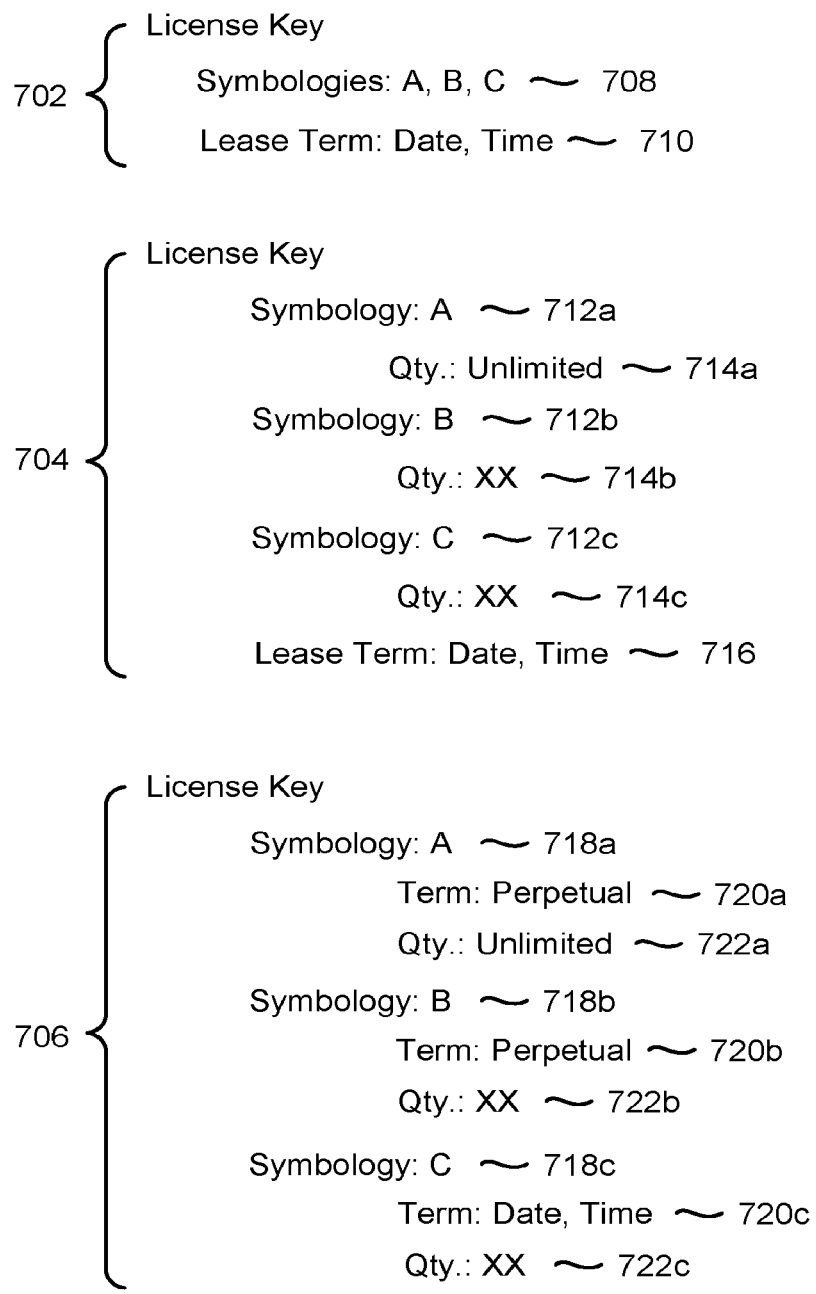
FIG. 15 shows examples of a data structure of a license key in accordance with some embodiments.

FIG. 15 shows examples of a data structure of a license key in accordance with some embodiments. A first example license key 702 may include data fields (that may be encrypted) which specify the symbologies 708 (for example, symbologies A, B, and C that correspond to a Universal Product Code (UPC), a Quick Response (QR) Code, and a Portable Data File (PDF)-417) and a lease term 710. The lease term 710 may specify a date and time at which the license key 702 expires. In response to receipt of this license key 702 (and decryption of the license key 702 if encrypted) the barcode-reading application 24 may transition to the licensed operation state 476, decode the specified symbologies 708 when in the licensed operation state 476 (while remaining disabled for decoding other symbologies not specified in the license, for example for a data matrix), and at the end of the lease term 710, transition back to the disabled state 474 (unless a new license key with an updated lease term 710 is received prior to expiration, which functions to extend the expiration of the lease term).

A second example license key 704 may include data fields (that may be encrypted) which specify the symbologies 712*a-c* (for example, symbologies A, B, and C that correspond to a UPC, a QR Code, and a PDF-417), and a licensed quantity of decodes 714*a-c* for each symbology 712*a-c*. The licensed quantity of decodes for a particular symbology, for example the licensed quantity 714*a* for symbology 712*a*, may be unlimited. The licensed quantity of decodes 714*b-c* for symbologies 712*b-c* may be limited to a specified quantity. The entire license key 704 may further include a lease term 716 which may specify a date and time at which the license key 704 expires. In response to receipt of this license key 704 (and decryption of the license key 704 if encrypted) the barcode-reading application 24 may transition to the licensed operation state 476, and decode the specified symbologies 712*a-c* when in the licensed operation state 476 up to the licensed quantities 714*a-c*. The barcode-reading application 24 may remain disabled for decoding other symbologies not specified in the license (e.g., symbologies other than 712*a-c*), automatically disable each of symbologies 712*b-c* when the total quantity of decodes of each symbology 712*b-c* exceeds the licensed quantity 714*b-c* (unless a new license key increases the quantity), and transition back to the disabled state 474 (unless a new license key with an updated lease term 710 is received prior to expiration, which functions to extend the expiration of the lease term). In this arrangement, the ability to decode symbologies 712*b-c* will expire upon the earlier of: i) reaching the maximum quantity of decodes 714*b-c*, or ii) expiration of the lease term 716.

A third example license key 706 may include data fields (that may be encrypted) which specify the symbologies 718*a-c* (for example, symbologies A, B, and C that correspond to a UPC, a QR Code, and a PDF-417), a license term 720*a-c* for each symbology 718*a-c*, and a licensed quantity 722*a-c* for each symbology 718*a-c*. The license term 720*a-c* may specify a date and time at which the license for that particular symbology 718*a-c* expires. The license term may be perpetual (e.g., license term 720*a-b*) or time limited (e.g., license term 720*c*). The licensed quantity of decodes for a particular symbology may be unlimited (e.g., the licensed quantity 722*a* for symbology 718*a*), or may specify a specific quantity (e.g., the licensed quantity 722*b-c* for symbologies 718*b-c*).

In response to the receipt of this license key 706 (and decryption of the license key 706 if encrypted) the barcode-reading application 24 may transition to the licensed operation state 476 and decode the specified symbologies 718*a-c* when in the licensed operation state 476 up to the licensed quantities 722*a-c* for each symbology and for the duration of the license term 720*a-c* for each symbology. The barcode-reading application 24 may remain disabled for decoding other symbologies not specified in the license (e.g., symbologies other than 718*a-c*), and automatically disable each of symbologies 718*b-c* when the earlier of: i) the expiration of the license term 720*a-c* for each symbology 718*a-c* expires, or ii) the total quantity of decodes of each symbology 718*b-c* exceeds the licensed quantity 722*b-c*, each being subject to an extension by a new license key with an increased term duration or an increased quantity.

Each of the license keys may be a data file, specifying the symbologies, the license terms, and the license quantities as depicted in FIG. 15. The data file may be encrypted utilizing an encryption key (e.g., a private key of a public/private key pair). The encrypted data file may form the license key and may be decrypted by the barcode-reading application 24 utilizing an encryption key (e.g., a public key of the public/private key pair). Other known encryption technologies may also be utilized for securing the delivery of the license key to the barcode-reading application including the license restrictions (e.g., licensed symbologies, license terms, and licensed quantities) within the license key.

FIG. 14B is a state machine diagram depicting three states of operation in a barcode-reading application 24 in accordance with another embodiment. The first state of operation may be a base state 470. When in the base state, the barcode-reading application 24 may include barcode-reading capabilities which, although functional and capable of generating useful decoded data, are limited by at least one factor or function (which will be referred to as a demonstration factor) which makes output of decoded data useful for demonstration purposes but not practical for ongoing operation.

The operation of the barcode-reading application 24 in the base state may be a base decoding mode of operation or a demonstration mode of operation. In the base decoding mode of operation, the barcode-reading application 24 may drive the camera of the mobile device 18 to capture an image of a barcode, and apply base decoder functions to the image to identify the barcode symbology. If the barcode symbology is a base symbology, the barcode-reading application 24 may decode the barcode and make the decoded data available for further processing. If the symbology is other than a base symbology, the barcode-reading application 24 may enter the demonstration mode of operation.

In the demonstration mode of operation, the barcode-reading application 24 may apply at least one unlicensed enhanced barcode-reading function to decode the barcode, and perform at least one of: i) outputting an indication of successfully decoding the barcode, or ii) implementing a restriction function. The restriction function may be at least one of: i) a function which scrambles decoded data; ii) a function which restricts the decoded data or scrambled decoded data from the barcode from being made available for further processing by at least one application executing on the mobile device; or iii) a function which restricts the decoded data or the scrambled decoded data from the barcode from being displayed on a display screen of the mobile device.

The at least one demonstration factor may include, but is not limited to: i) a scrambling function which, upon generating decoded data, provides the output in a scrambled or truncated format for purposes of demonstrating decoding capabilities (and decoder performance) but preventing use of the decoded data for further data processing, ii) a time delay function which, upon generating and outputting decoded data (or scrambled decoded data), provides for implementing a time delay before a barcode of the same symbology can again be successfully decoded, iii) an output restriction function which restricts decoded data (or scrambled decoded data) from being made available for further processing by at least one application executing on the mobile device 18, and iv) an output restriction function which enables outputting decoded data (or scrambled decoded data) to the display screen and prevents the decoded data from being further processed by the mobile device 18 (other than presentation on the display screen) or transmission to a remote application.

The demonstration mode of operation may include an upgrade function. The upgrade function may enable user selection to obtain the license code and upon user selection to obtain the license code, establish the network connection to the licensing server and obtain the license code from the licensing server 21*a*, 21*b*.

The at least one demonstration factor may be applied to selected symbologies or all symbologies. Different demonstration factors may be applied to different symbologies.

The barcode-reading application 24 may transition from the base state 470 to a license key retrieval state 471. Reading a barcode to which a demonstration factor applies may trigger transition of the barcode-reading application 24 to the license key retrieval state 471. Alternatively, the barcode-reading application 24 may transition to the license key retrieval state 471 upon user selection of the license key retrieval state 471.

When in the license key retrieval state 471 the barcode-reading application 24 may connect to a licensing server 21a, 21b to obtain a license key. After obtaining the license key, the barcode-reading application 24 may transition to a licensed operation state 472 (i.e., an enhanced operation state).

The licensed operation state 472 may enable the barcode-reading application 24 to function without limitations of the at least one demonstration factor such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16), in each case without being impeded by the demonstration factor.

As described with respect to the licensed operation state 476 in FIG. 14A, there may be two sub-embodiments of the licensed operation state 472. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 to the licensed operation state 472. The restrictions may be symbology restrictions, time restrictions, and/or quantity restrictions.

Figure 16A:
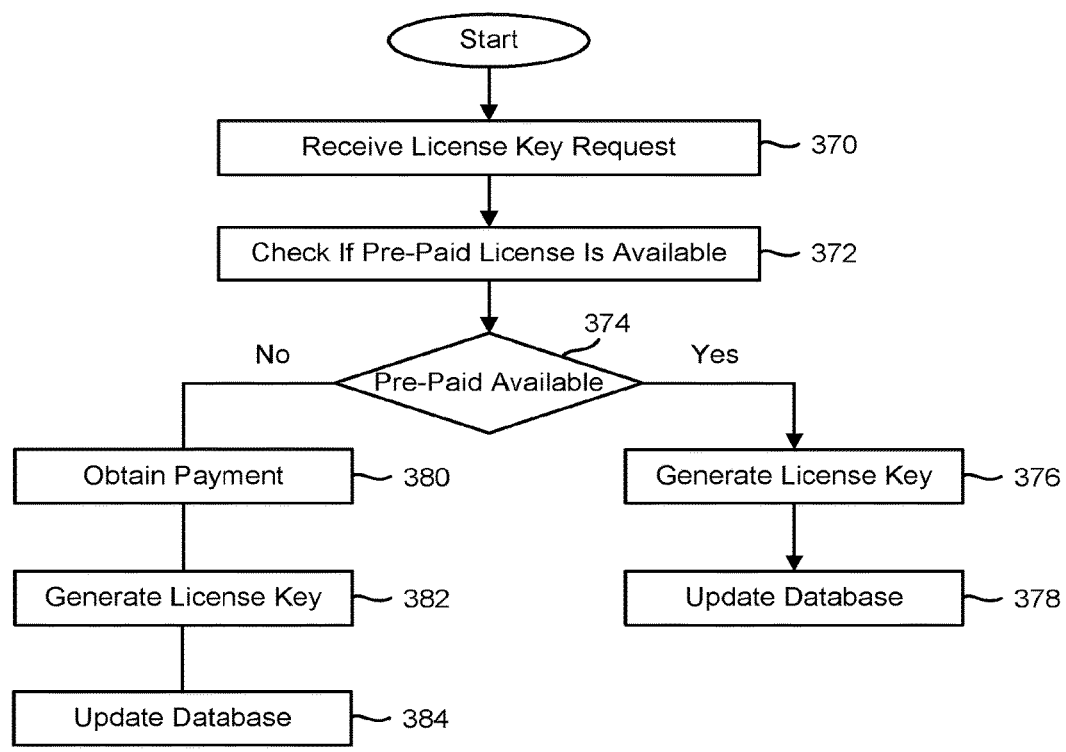
FIG. 16A depicts an exemplary operation of a license server.

FIG. 16A depicts an exemplary operation of a license server 21a, 21b. Step 370 represents receiving a license key request from the barcode-reading application 24 (or other application) of the mobile device 18. Receiving the license key request may include authenticating the user of the mobile device 18. Authenticating the user of the mobile device 18 may include: i) authenticating the individual to which the mobile device is assigned or the individual using the mobile device (or the individual who controls the mobile device), for example utilizing a combination of a user ID and a password or similar schemes for authenticating an individual; and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the organization, company, or group.

Step 372 represents the license server 21a, 21b checking whether a pre-paid license is available for the mobile device 18. More specifically, the identity of the individual, organization, company, or other group of users identified during the authentication may be used to look up (e.g., in a license database) licenses available to that individual, organization, company, or other group of users (if any). For a particular individual, organization, company, or other group of users, a certain quantity of licenses may have been pre-purchased.

FIG. 16C depicts an exemplary database 739 for recording pre-paid licenses that may have been purchased by an individual, organization, company, or other group of users. Each such individual, organization, company, or other group of users may be identified by a group ID 740, 750. Associated with each group ID is one or more license IDs 742, 752a, 752b, each of which identifies a license type for the barcode-reading application 24 which may have been purchased in quantities of one or more. Each license type may be, as an example, one of the license types identified by the license keys 702, 704, 706 of FIG. 15.

Each license ID 742, 752a, 752b may be associated with identification of: i) the quantity of the license type purchased 744, 754a, 754b; ii) the quantity used 746 or the quantity in use 756a, 756b; and/or iii) the quantity remaining 748, 758a, 758b for issuance to mobile devices 18. It should be appreciated that recording both the quantity used 746 or the quantity in use 756a, 756b as well as the quantity remaining 748, 758a, 758b for issuance to mobile devices is duplicative as either value can be calculated from the quantity purchased 744, 754a, 754b and the other value.

Recording the quantity used 746 is useful when licenses are purchased for a single mobile device, and once a license is issued to a particular mobile device it is permanently associated with that mobile device and may not be re-assigned to another mobile device without manual intervention.

Recording the quantity in use 756a, 756b is useful when the licenses are concurrent-use licenses, and when a license assigned to a mobile device expires it is considered no longer in-use and can be reassigned to another mobile device 18.

It should also be appreciated that if the quantity of licenses purchased is unlimited 754a, it is irrelevant to track in-use licenses 756a, 756b and remaining licenses 758a, 758b. When utilizing the concurrent-use licenses, for the in-use licenses 756b, the database may include an in-use table 760 which records, for each license 762, the time 764 at which it expires (e.g., the lease term 710 from FIG. 15) such that upon expiration (if the expiration is not updated by way of renewal), the license will revert to remaining inventory 758b and can be issued to a different mobile device 18.

It should be appreciated that this licensing scheme enables a mobile device 18 to obtain a license for a specific term, and so long as the mobile device 18 obtains a renewal license prior to expiration, the barcode-reading application 24 can operate under the license even if the mobile device is (periodically) uncoupled from any network and unable to contact the license server 21a, 21b.

Returning to FIG. 16A, step 374 represents determining whether a pre-paid license is available. If a prepaid license is available at step 374, a license key for the pre-paid license is generated at step 376 and the database 739 is updated at step 378. Updating the database may include recording the license as used 746 or in use 756b.

If it is determined at step 374 that a pre-paid license is not available, payment is obtained for a license at step 380. Step 380 may involve determining the type of license being requested (e.g., as identified by license keys 702, 704, 706), including the licensed symbology(ies) as well as license term(s) and license quantity(ies) for each symbology(ies). In one embodiment, the barcode-reading application 24 may, under the control of the license server 21*a*, 21*b*, generate a menu for user selection of these license parameters (i.e., symbologies, license terms and license quantities) and display on a screen of the mobile device 18 pricing alternatives for desired license parameters.

After payment is obtained, a license key for the license is generated at step 382 and the database 739 is updated at step 384 to reflect a newly purchased license for a user (group ID). If the newly purchased license is a concurrent-use license, updating the database may include recording the license as well as its expiration.

As stated, this licensing scheme enables a mobile device 18 to obtain a license for a specific term, and so long as the mobile device 18 obtains a renewal license prior to expiration, the barcode-reading application 24 can continue operation under the license even if the mobile device 18 is uncoupled from any network and unable to contact the license server 21*a*, 21*b*.

Figure 16B:
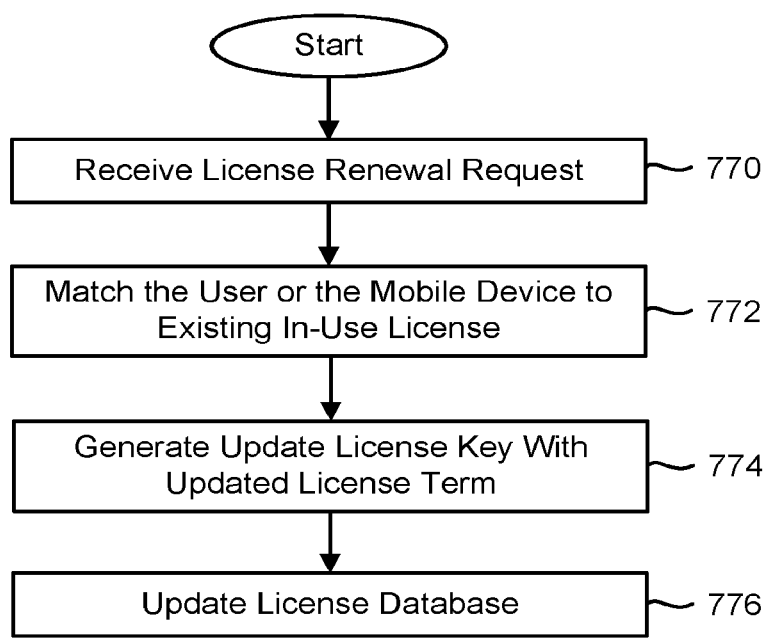
FIG. 16B depicts an exemplary operation of a license server for renewing a license for a mobile device prior to expiration of the license.

FIG. 16B depicts an exemplary operation of a license server 21*a*, 21*b* for renewing a license for a mobile device 18 prior to the expiration of the license (e.g., prior to the in-use license 756*b* reverting to a remaining license 758*b*).

Step 770 represents receiving a license key renewal request from the barcode-reading application 24 (or other application) of the mobile device 18. Receiving the license key renewal request may include authenticating the user of the mobile device 18. Authenticating the user of the mobile device 18, as discussed, may include: i) authenticating the individual to which the mobile device is assigned, or the individual using the mobile device (or the individual who controls the mobile device), for example utilizing a combination of a user ID and a password, or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the individual, organization, company, or group. The mobile device 18 (e.g., the barcode-reading application) may communicate to the licensing server i) a unique identification code of the mobile device 18 or ii) a user identification code identifying a controller of the mobile device 18.

Step 772 represents the license server 21*a*, 21*b* matching the user or the mobile device 18 to the existing in-use license, which may be recorded in an in-use table (for example, the in-use table 760 shown in FIG. 16*c*).

Step 774 represents generating, and providing to the mobile device 18, an update license key which, as depicted by license key 702 of FIG. 15, may include an updated license term.

Step 776 represents updating the license database such that the expiration date of the license in the in-use table 760 is updated.

As disclosed above, the barcode-reading application 24 may be configured to operate in a base mode or an enhanced mode. In the base mode of operation, the barcode-reading application 24 may be configured to control a network interface of the mobile device 18 to establish a network connection to a licensing server 21*a*, 21*b* and obtain a license code from the licensing server 21*a*, 21*b*; subject the license code to a predetermined algorithm and determine at least one operating permission authorized by the license code; and enable an enhanced mode of operation. In the enhanced mode of operation, the barcode-reading application 24 may be configured to implement at least one enhanced barcode-reading function which corresponds to the at least one operating permission authorized by the license code.

The at least one enhanced barcode-reading function may include a function of decoding a barcode symbology that the decoder is restricted from decoding in the base mode of operation. Alternatively or additionally, the at least one enhanced barcode-reading function may include a function of decoding multiple barcodes in sequence at a rate that is faster than a rate at which the barcode-reading application can decode multiple barcodes in sequence in the base mode of operation. Alternatively or additionally, the at least one enhanced barcode-reading function may include a function of decoding a quantity of barcodes of a particular symbology that exceeds a restricted quantity of barcodes of the particular symbology that the barcode-reading application can decode in the base mode of operation.

Alternatively or additionally, the at least one enhanced barcode-reading function may remove a demonstration restriction function under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced barcode-reading function may enable at least one enhanced image processing function that improves an ability to decode an image of a barcode and is not operable when the decoder operates in the base mode of operation.

The base mode of operation may include a base decoding mode of operation and a demonstration mode of operation. In the base decoding mode of operation, the barcode-reading application may be configured to drive the general-purpose camera assembly to capture an image of a barcode, and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology. In the demonstration mode of operation, the barcode-reading application 24 may be configured to: apply at least one enhanced barcode-reading function to decode the barcode, and perform at least one of outputting an indication of successful decoding of the barcode or implementing a restriction function. The restriction function may be at least one of: i) a function that scrambles decoded data, ii) a function that restricts the decoded data or scrambled decoded data from being made available for further processing by at least one application executing on the mobile device 18, or iii) a function that restricts the decoded data or the scrambled decoded data from being displayed on a display screen of the mobile device 18.

The barcode-reading application 24 may be configured to perform an upgrade function in the demonstration mode of operation. The upgrade function may enable a user selection to obtain the license code, obtain the license code based on the user selection, establish a network connection to the licensing server 21a, 21b, and obtain the license code from the licensing server 21a, 21b.

In order to obtain the license code from the licensing server 21a, 21b, the barcode-reading application 24 may be configured to communicate to the licensing server 21a, 21b one of: i) a unique identification code of the mobile device 18, or ii) a user identification code identifying a controller of the mobile device 18.

In accordance with another embodiment, a barcode-reading system for a mobile device may include a barcode-reading enhancement accessory secured to the mobile device 18 and a barcode-reading application 24 stored in a memory of the mobile device 18 and executable by a processor 44 of the mobile device 18. The barcode-reading enhancement accessory may include at least one optic system that is positioned either within a field of illumination of a white light source of the mobile device 18 for modifying the field of illumination projected by the white light source, or within a field of view of a camera of the mobile device 18 for modifying illumination reflected from objects within the field of view of the camera.

The barcode-reading application 24 may include: i) an image capture function for controlling the white light source and the camera to capture an image of a barcode wherein the image of the barcode may be affected by the at least one optic system, ii) a base decoder function for decoding a barcode in a base mode of operation if an enhanced decoder mode has not been authorized, and iii) an enhanced decoder function for decoding a barcode in an enhanced mode of operation if the enhanced decoder mode has been authorized.

The enhanced decoder function may include a function of decoding a barcode that the barcode-reading application 24 is restricted from decoding in the base mode of operation. Alternatively or additionally, the enhanced decoder function may include a function of decoding multiple barcodes in sequence at a rate that is faster than a restricted rate at which the barcode-reading application 24 can decode a sequence of multiple barcodes when in the base mode of operation. Alternatively or additionally, the enhanced decoder function may include a function of decoding a quantity of barcodes of a particular symbology that exceeds a restricted quantity of barcodes of the particular symbology which the barcode-reading application 24 can decode when in the base mode of operation.

Alternatively or additionally, the enhanced decoder function may remove a demonstration restriction function under which the barcode-reading application 24 functions when in the base mode of operation, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device, or iii) a function which restricts the decoded data or the scrambled decoded data from a barcode of at least one particular symbology from being displayed on a display screen of the mobile device 18.

Alternatively or additionally, the enhanced decoder function may enable at least one enhanced image processing function which improves an ability to decode an image of a barcode and is not operable when the barcode-reading application 24 operates in the base mode of operation. The enhanced decoder mode is enabled by obtaining a license code from a licensing server 21a, 21b.

The barcode-reading application 24 may be configured to subject the license code to a predetermined algorithm to determine at least one operating permission authorized by the license code. The enhanced decoder function may correspond to the at least one operating permission authorized by the license code.

The barcode-reading application 24 may be configured to obtain the license code from the licensing server 21a, 21b by communicating to the licensing server one of: i) a unique identification code of the mobile device 18, or ii) a user identification code identifying a controller of the mobile device 18.

Figure 17B:
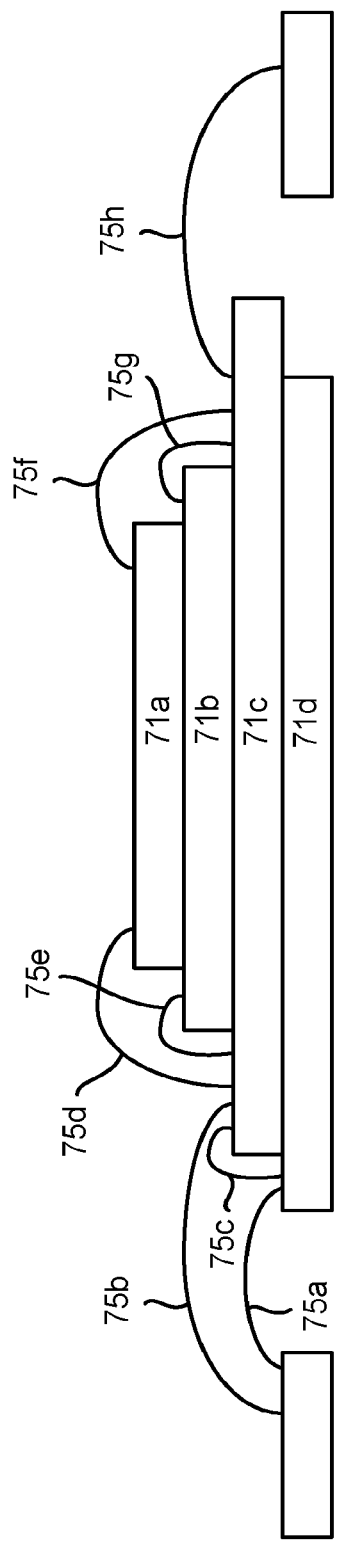

FIGS. 17A and 17B are schematic plan and elevation views, respectively, of an example integrated circuit package 73 in accordance with one embodiment. The integrated circuit package 73 is a three-dimensional integrated circuit that is manufactured by stacking several silicon wafers or dies (i.e., chips) and interconnecting them vertically using through-silicon vias (TSVs) and/or wires. The three-dimensional integrated circuit package 73 operates as a single device. By stacking multiple wafers or dies, performance can be improved and the device can be manufactured with a smaller footprint.

In one embodiment, the top layer 71a of the integrated circuit package 73 may include the image sensor system 111 shown in FIG. 3 with the photo sensor array 102 exposed for capturing illumination through an optic system provided above the top layer 71a. The second layer 71b may include a flash memory. The third layer 71c may include the image capture control and output system 107 shown in FIG. 3. The fourth layer 71d may include additional random access memory. The image sensor system 111 and the image capture control and output system 107 are included within the same integrated circuit package 73. It should be noted that FIGS. 17A and 17B depict an integrated circuit package 73 having four layers 71a-71d as an example, and the integrated circuit package 73 may have more or fewer than four layers.

Each layer 71a-71d may include one or more contact pads 77a-77g for interconnecting to other layers by wires 75a-h for data transmission and providing power, clock, and ground to each layer from the ball grid array 79 connecting the integrated circuit package 73 to a printed circuit board (not shown).

In one embodiment, the decoder 25, the (software-based) image processing module 979, and the license key 26, as shown in FIG. 3, may be a part of the image capture control and output system 107 which outputs decoded data to the mobile device system (i.e., via the hardware circuits 90) via the communication interface 115 between the communication circuits 30 of the image capture control and output system 107 of the imaging-based barcode reader module 23 and the communication circuits 113 of the mobile device system.

In an alternative embodiment, the decoder 25, the (software-based) image processing module 979, and the license key 26, as shown in FIG. 2A, may be a part of the application 24 operated by the mobile device system with the image capture control and output system 107 outputting image data records to the mobile device system via the communication interface 115 between the communication circuits 30 of the image capture control and output system 107 of the imaging-based barcode reader module 23 and the communication circuits 113 of the mobile device system.

Figure 18:
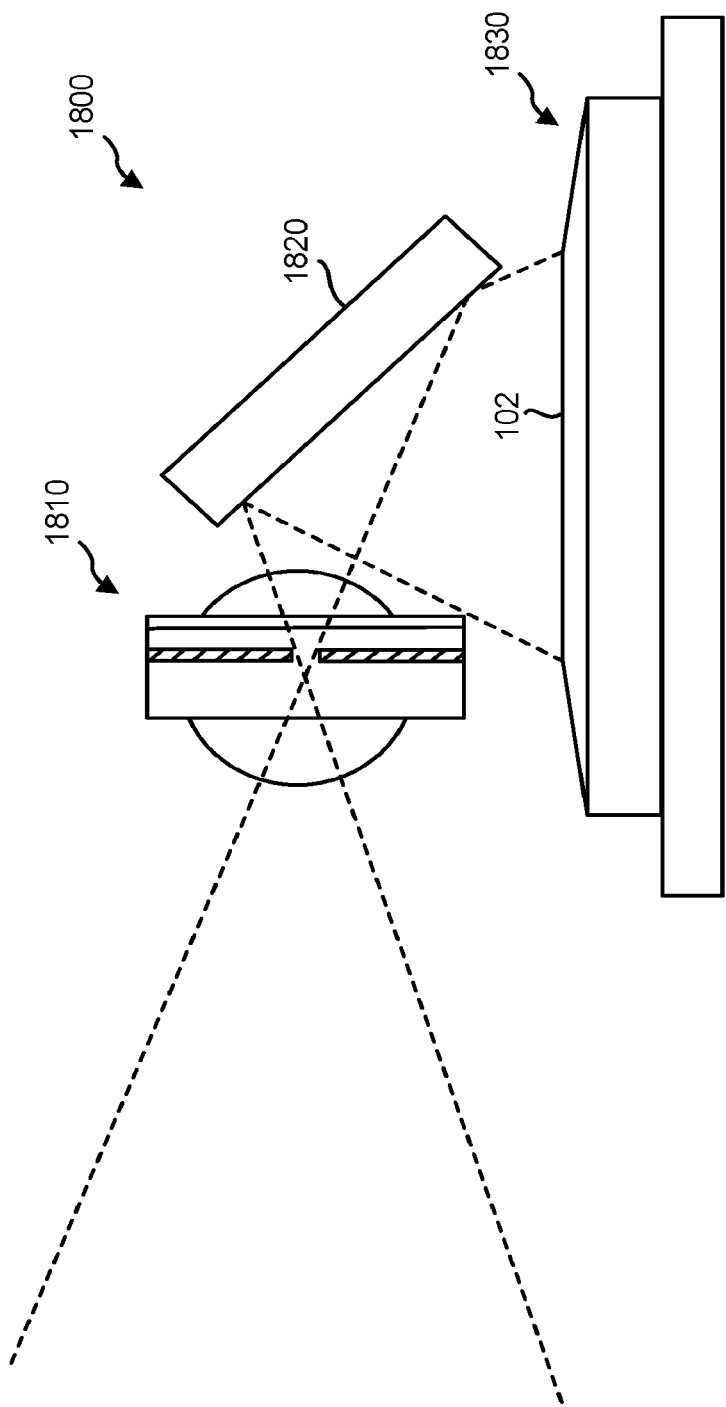
FIG. 18 is an example of a low-profile optic system which folds the optical path on the image side of the optic system.

FIG. 18 shows an example of a low-profile optic system 1800 which folds an optical path on the image side of the optic system. The optic system 1800 includes a lens assembly 1810 and a mirror 1820. The lens assembly 1810 captures an illumination in a field of view and the mirror 1820 located behind the lens assembly 1810 folds an optical path of the lens assembly 1810 onto the photo sensor array 102. The mirror 1820 is placed in the center of the photo sensor array 102 and placed as close to the lens assembly 1810 as possible so that the overall profile height of the optic system 1800 can be minimized.

Both the lens assembly 1810 and the mirror 1820 are provided above the photo sensor array 102 included in an integrated circuit package 1830. The integrated circuit package 1830 including the photo sensor array 102 may be a three-dimensional integrated circuit package, such as the integrated circuit package 73 in FIGS. 17A and 17B, including a stack of silicon wafers or dies that are stacked vertically and inter-connected by TSVs or wires. The lens assembly 1810 and the mirror 1820 may be provided above the top layer 71a of the integrated circuit package 73 behind the lens assembly 1810 (e.g. within the image side of the lens assembly 1810, not the object side).

The top layer 71a may include the image sensor system 111 so that the optic system 1800 focuses an image of a barcode on the two-dimensional photo sensor array 102 on the image sensor system 111. As disclosed above, the image capture control and output system 107 may be included in another layer (e.g., in the third layer 71c) of the integrated circuit package 73. An image processing circuit configured to receive the frame of image data and perform image processing functions to generate at least one image data record from the frame of image data may be included in the image sensor system 111 and/or the image capture control and output system 107.

Each image data record may be a derivative of the frame of image data. Each image data record may be generated by applying a distinct image processing convolution kernel to the frame of image data. Each image data record may be generated by applying a convolution kernel to both: i) the frame of image data, and ii) a reduced resolution image resulting from reducing the resolution of the frame of image data by sub-sampling or binning.

The mirror 1820 may be a flat mirror as shown in FIG. 18. Alternatively, the mirror 1820 may be a convex mirror so that the illumination coming through the lens assembly 1810 may be expanded further onto the photo sensor array 102. An aperture 1822, which may be an opaque plate with an aperture therein, may define the aperture of the optic system.

The photo sensor array 102 may be used to capture the frame of image data using a rolling shutter mode of operation. The image read-out circuitry in the image sensor system 111 may be configured to sequentially commence exposure for each row of pixels of the photo sensor array 102 from a first row to a last row of the photo sensor array 102 so that each row of pixels may be exposed from an exposure start time to an exposure end time for the row for a duration of an exposure period. Alternatively, the photo sensor array 102 may be configured to capture the frame of image data using a global shutter mode of operation.

In a preferred embodiment, the optic system 1800 may be included within the mobile device 18 with the photo sensor 102 parallel to the face surface 72 and back side surface 74 of the mobile device and the mirror 1820 folding the optic path such that the field of view of the optic system 1800 is beyond the top side 78 of the mobile device. The phrase "above the photo sensor", in such structure would my displaced from the photo sensor along a direction generally perpendicular to face surface 72 and backside surface 74. Stated another way, the mirror 1820 is positioned on an axis extending from the center of the photo sensor 102, perpendicular to the photo sensor 102. The lens assembly 1810 is displaced from the mirror in a direction parallel to the photo sensor 102, but displaced by a distance less than half the dimension of the photo sensor 102 such that it is above the photo sensor, not simply above a plane defined by the photo sensor but at a position that is not over the surface of the photo sensor.

As used herein, the phrase "substantially parallel" means within five degrees of parallel. In another embodiment, substantially parallel means within 15 degrees of parallel. In another embodiment, substantially parallel means within 20 degrees of parallel.

As used herein, the phrase "substantially perpendicular" means within five degrees of perpendicular. In another embodiment, substantially perpendicular means within 15 degrees of perpendicular. In another embodiment, substantially perpendicular means within 20 degrees of perpendicular.

As used herein, the term "determining" encompasses a wide variety of actions and, therefore, "determining" can include calculating, computing, processing, deriving, investigating, looking up (e.g., looking up in a table, a database or another data structure), ascertaining, and the like. Also, "determining" can include receiving (e.g., receiving information), accessing (e.g., accessing data in a memory), and the like. Also, "determining" can include resolving, selecting, choosing, establishing, and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc. described in connection with any one of the configurations described herein may be combined with one or more of the functions, procedures, operations, components, elements, structures, etc. described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A mobile device, comprising:
   a photo sensor array;
   a lens assembly for capturing an image of a barcode, wherein the lens assembly has an object side facing the barcode to be captured and an image side facing a direction opposite the object side;
   a mirror located on the image side of the lens assembly, wherein the mirror is configured to reflect the image of the barcode received via the lens assembly onto the photo sensor array, and wherein both the lens assembly and the mirror are positioned above the photo sensor array;

a processor;

memory in electronic communication with the processor;

a barcode-reading application stored in the memory, wherein the barcode-reading application comprises a relay function configured to transmit data decoded from the image of the barcode to a remote server via a wireless connection; and instructions stored in the memory, the instructions being executable by the processor to download the barcode-reading application to the mobile device from a remote application server.

2. The mobile device of claim 1, the barcode-reading application further comprising a decoder function configured to receive the image of the barcode, decode the image of the barcode, and generate data decoded from the image of the barcode.

3. The mobile device of claim 2, wherein the barcode-reading application requires a license key from a license server to enable operation of the decoder function.

4. The mobile device of claim 3, the barcode-reading application further comprising a licensing function configured to establish a network connection to the license server and obtain the license key from the license server.

5. The mobile device of claim 1, the memory further comprising an operating system that comprises an application retrieval system, wherein the application retrieval system is configured to download the barcode-reading application to the mobile device from the remote application server.

6. The mobile device of claim 5, wherein the application retrieval system is further configured to obtain a decoder application from the remote application server.

7. The mobile device of claim 6, wherein the decoder application requires a license key from a license server to enable operation.

8. The mobile device of claim 1, wherein the mirror is a flat mirror.

9. The mobile device of claim 1, wherein the mirror is a convex mirror.

10. The mobile device of claim 1, wherein:

the mobile device comprises a face surface and a back-side surface;

the face surface and the back-side surface are parallel;

the photo sensor array is parallel to the face surface and the back-side surface;

the mirror is positioned on an axis that extends from a center of the photo sensor array, perpendicular to the photo sensor array; and the lens assembly is displaced from the mirror in a direction parallel to the photo sensor array and by a distance that is less than half of a dimension of the photo sensor array.

11. The mobile device of claim 10, wherein the lens assembly has a field of view beyond a top edge of the mobile device, and wherein the top edge of the mobile device is substantially perpendicular to the face surface and the back-side surface.

12. The mobile device of claim 1, wherein the mirror is placed in the center of the photo sensor array.

13. The mobile device of claim 1, wherein the photo sensor array is included in an integrated circuit package.

14. A barcode reader, comprising:

a photo sensor array;

an optic system for focusing an image of a barcode on the photo sensor array, the optic system including a lens assembly and a mirror, wherein both the mirror and the lens assembly are positioned above the photo sensor array, and wherein the mirror is located on an image side of the optic system and folds an optical path onto the photo sensor array;

a processor;

memory in electronic communication with the processor; and a barcode-reading application stored in the memory, wherein the barcode-reading application comprises a relay function configured to transmit data decoded from the image of the barcode to a remote server via a wireless connection.

15. The barcode reader of claim 14, the barcode-reading application further comprising a decoder function configured to receive the image of the barcode, decode the image of the barcode, and generate data decoded from the image of the barcode.

16. The barcode reader of claim 15, wherein the barcode-reading application requires a license key from a license server to enable operation of the decoder function.

17. The barcode reader of claim 16, the barcode-reading application further comprising a licensing function configured to establish a network connection to the license server and obtain the license key from the license server.

18. The barcode reader of claim 14, the memory further comprising an operating system that comprises an application retrieval system, wherein the application retrieval system is configured to obtain the barcode-reading application from a remote application server.

19. The barcode reader of claim 18, wherein the application retrieval system is further configured to obtain a decoder application from the remote application server.

20. The barcode reader of claim 19, wherein the decoder application requires a license key from a license server to enable operation.

* * * * *